(12) United States Patent
Ogawa et al.

(10) Patent No.: US 9,516,726 B2
(45) Date of Patent: Dec. 6, 2016

(54) METHOD FOR CONTROLLING COMMUNICATIONS TERMINAL AND PROGRAM

(71) Applicant: Panasonic Intellectual Property Corporation of America, Torrance, CA (US)

(72) Inventors: Kento Ogawa, Osaka (JP); Toru Tanigawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 145 days.

(21) Appl. No.: 14/470,732

(22) Filed: Aug. 27, 2014

(65) Prior Publication Data

US 2015/0069915 A1    Mar. 12, 2015

(30) Foreign Application Priority Data

Sep. 10, 2013  (JP) ................... 2013-187135

(51) Int. Cl.
 *H05B 37/02* (2006.01)
 *G04C 19/02* (2006.01)
 *G04G 11/00* (2006.01)

(52) U.S. Cl.
 CPC ........... *H05B 37/0227* (2013.01); *G04C 19/02* (2013.01); *G04G 11/00* (2013.01); *H05B 37/0245* (2013.01); *H05B 37/0281* (2013.01)

(58) Field of Classification Search
 CPC .................. H05B 37/0227; H05B 37/0272
 (Continued)

(56) References Cited

U.S. PATENT DOCUMENTS

| 8,203,445 B2 * | 6/2012 | Recker .................. G08B 5/36 315/158 |
| 8,901,827 B1 * | 12/2014 | Xu .................. F21S 9/037 315/153 |

(Continued)

FOREIGN PATENT DOCUMENTS

| JP | 2007-294143 | 11/2007 |
| WO | 2012/146256 | 11/2012 |

OTHER PUBLICATIONS

The Partial European Search Report from European Patent Office (EPO) dated Dec. 15, 2015 for the related European Patent Application No. 14183470.5.

(Continued)

*Primary Examiner* — Don Le
(74) *Attorney, Agent, or Firm* — Greenblum & Bernstein, P.L.C.

(57) ABSTRACT

A method for controlling a communications terminal is provided. The method includes causing a computer included in the communications terminal to store first illumination setting information and second illumination setting information in the memory; causing the computer of the communications terminal to transmit, at a certain illumination start time at which the illumination device is to be turned on, a first control signal corresponding to the first illumination setting information to the illumination device such that the illumination device is set to the first illumination state; and causing the computer of the communications terminal to transmit, in a case where the sensor senses a motion of the communications terminal after the certain illumination start time has passed, a second control signal corresponding to the second illumination setting information to the illumination device such that the illumination device is set to the second illumination state.

23 Claims, 18 Drawing Sheets

(58) Field of Classification Search
USPC .......................................................... 315/291
See application file for complete search history.

(56) References Cited

U.S. PATENT DOCUMENTS

| | | |
|---|---|---|
| 2005/0234312 A1 | 10/2005 | Suzuki et al. |
| 2011/0230790 A1 | 9/2011 | Kozlov |
| 2012/0280565 A1 | 11/2012 | Logvinov |
| 2013/0163394 A1 | 6/2013 | Loree, IV |
| 2014/0058198 A1* | 2/2014 | St. George ......... A61B 1/00036 |
| | | 600/109 |

OTHER PUBLICATIONS

The Extended European Search Report from European Patent Office (EPO) dated Mar. 11, 2016 for European Patent Application No. 14183470.5.

Shideh Dashti et al: "iShake: Using Personal Devices to Deliver Rapid Semi-Qualitative Earthquake Shaking Information", Feb. 28, 2011, pp. 1-46.

* cited by examiner

METHOD FOR CONTROLLING COMMUNICATIONS TERMINAL AND PROGRAM

BACKGROUND OF THE INVENTION

1. Field of the Invention

The present disclosure relates to a method for controlling a communications terminal that controls an illumination device via a network, and a program.

2. Description of the Related Art

Techniques for controlling illumination of an illumination device around a wake-up time have been suggested. For example, an illumination device according to Japanese Unexamined Patent Application Publication No. 2007-294143 is configured to realize comfortable awakening by setting an expected wake-up time, an illumination start time around the wake-up time, an illuminance, and a maximum illuminance time, and by gradually increasing the illuminance of illumination around the wake-up time.

SUMMARY OF THE INVENTION

However, the technique according to the above-mentioned Japanese Unexamined Patent Application Publication No. 2007-294143 requires a further improvement.

In one general aspect, the techniques disclosed here feature a method for controlling a communications terminal that controls an illumination device via a network. The communications terminal includes a computer, a memory, and a sensor that senses a motion of the communications terminal. The method includes causing the computer of the communications terminal to store first illumination setting information and second illumination setting information in the memory, the first illumination setting information being used to set the illumination device to a first illumination state, the second illumination setting information being used to set the illumination device to a second illumination state different from the first illumination state; causing the computer of the communications terminal to transmit, at a certain illumination start time at which the illumination device is to be turned on, a first control signal corresponding to the first illumination setting information to the illumination device via the network such that the illumination device is set to the first illumination state; and causing the computer of the communications terminal to transmit, in a case where the sensor senses a motion of the communications terminal after the certain illumination start time has passed, a second control signal corresponding to the second illumination setting information to the illumination device via the network such that the illumination device is set to the second illumination state.

The general and specific aspect may be implemented using a system, a method, and a computer program, and any combination of systems, methods, and computer programs.

According to aspects of the present disclosure, a further improvement can be realized.

DESCRIPTION OF THE PREFERRED EMBODIMENTS

Figure 1:
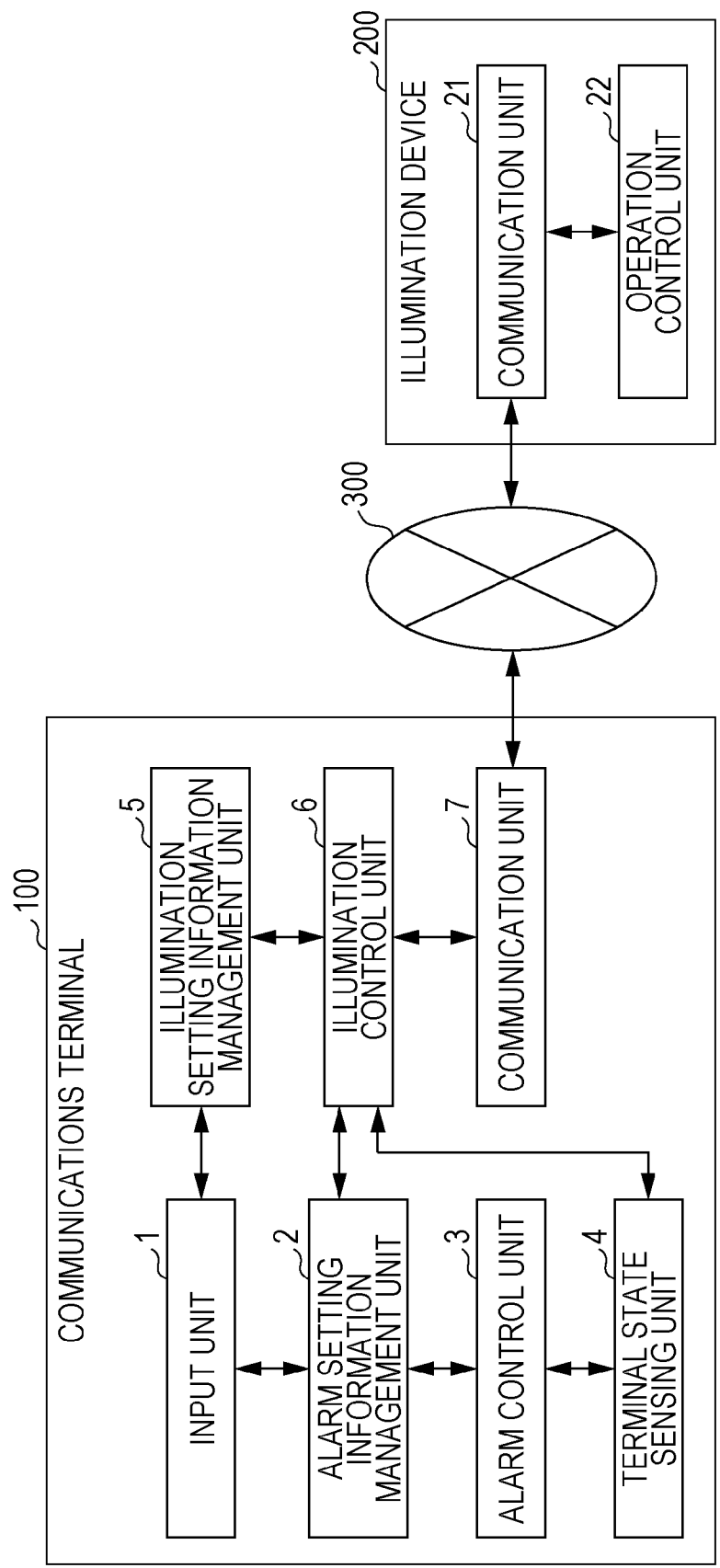
FIG. 1 is a diagram illustrating the configuration of an illumination control system according to a first embodiment of the present disclosure.

How aspects of invention according to present disclosure have been conceived

First of all, a description will be given of the matters the inventors have studied to make individual aspects of the invention according to the present disclosure. The inventors think that an appropriate illuminance for awakening a sleeping user and an appropriate illuminance for a user who has woken up are not uniform and vary among different users. In particular, the inventors think that an appropriate illuminance for a user who has woken up varies depending on the personal preference or mood of the user.

With the illumination device according to Japanese Unexamined Patent Application Publication No. 2007-294143, an illuminance for awakening a sleeping user can be set, but appropriate setting of an illuminance for a user who has woken up is not taken into consideration. Further, with the illumination device according to Japanese Unexamined Patent Application Publication No. 2007-294143, the awakening of a user is not easily detected and thus the user needs to set, by himself/herself, an appropriate illuminance after waking up, which is inconvenient.

In accordance with the above-described studies, the inventors have conceived of the aspects of the invention described below.

An aspect of the present disclosure is a method for controlling a communications terminal that controls an illumination device via a network. The communications terminal includes a computer, a memory, and a sensor that senses a motion of the communications terminal. The method includes causing the computer of the communications terminal to store first illumination setting information and second illumination setting information in the memory, the first illumination setting information being used to set the illumination device to a first illumination state, the second illumination setting information being used to set the illumination device to a second illumination state different from the first illumination state; causing the computer of the communications terminal to transmit, at a certain illumination start time at which the illumination device is to be turned on, a first control signal corresponding to the first illumination setting information to the illumination device via the network such that the illumination device is set to the first illumination state; and causing the computer of the communications terminal to transmit, in a case where the sensor senses a motion of the communications terminal after the certain illumination start time has passed, a second control signal corresponding to the second illumination setting information to the illumination device via the network such that the illumination device is set to the second illumination state.

According to this aspect, the illumination device is brought into the first illumination state at the illumination start time of the illumination device. For example, before an expected time at which a user wakes up in the morning, the illumination device lights up dimly. When it is judged that the user has started moving, in accordance with a motion of the communications terminal, for example, the user has picked up the communications terminal (for example, smart phone), the illumination device is brought into the second illumination state (for example, normal brightness). Therefore, the awakening of the user can be easily detected, and not only the illumination state before the user wakes up but also the illumination state after the user wakes up can be controlled appropriately and easily.

Hereinafter, the embodiments of the present disclosure will be described with reference to the attached drawings. Note that the following embodiments are examples in which the aspects of the present disclosure are embodied, and do not limit the technical scope of the present disclosure.

First Embodiment

FIG. 1 is a diagram illustrating the configuration of an illumination control system according to a first embodiment of the present disclosure. The illumination control system illustrated in FIG. 1 includes a communications terminal 100 and an illumination device 200. The illumination device 200 illuminates a space in which a user sleeps. The communications terminal 100 controls the illumination device 200.

The communications terminal 100 is connected to the illumination device 200 via a network 300 so as to be capable of communicating with the illumination device 200. The network 300 is, for example, the Internet. The communications terminal 100 and the illumination device 200 are connected to each other via the network 300 so as to be capable of communicating with each other, but the present disclosure is not particularly limited thereto. The communications terminal 100 and the illumination device 200 may be connected to each other via a wireless or wired local area network (LAN), or may be connected to each other using wireless communication such as infrared communication.

The communications terminal 100 is constituted by, for example, a mobile phone, a smart phone, a tablet computer, or a personal data assistance (PDA). The communications terminal 100 includes an input unit 1, an alarm setting information management unit 2, an alarm control unit 3, a terminal state sensing unit 4, an illumination setting information management unit 5, an illumination control unit 6, and a communication unit 7.

The input unit 1 is constituted by, for example, a touch panel or an operation key, and accepts input of information from the user.

The alarm setting information management unit 2 holds and manages alarm setting information representing a time at which an alarm is to be output. The user inputs a wake-up time via the input unit 1. The alarm setting information management unit 2 holds, as alarm setting information, the user's wake-up time input via the input unit 1.

The alarm control unit 3 outputs an alarm on the basis of the alarm setting information held by the alarm setting information management unit 2. That is, the alarm control unit 3 outputs an alarm when the current time becomes the user's wake-up time represented by the alarm setting information.

The terminal state sensing unit 4 is constituted by, for example, an inclination sensor for measuring an azimuth, an inclination angle, and a rotation angle of the communications terminal 100, and senses a motion of the communications terminal 100.

The illumination setting information management unit 5 holds and manages first illumination setting information and second illumination setting information. The first illumination setting information is used to set, before the user wakes up, an illumination state of the illumination device 200 in a space in which the user sleeps. The second illumination setting information is used to set, after the user wakes up, an illumination state of the illumination device 200 in the space. The first illumination setting information includes, for example, a maximum illuminance value that enables the user to wake up. The first illumination setting information may further include, for example, an awakening wavelength that enables the user to wake up. The second illumination setting information includes a setting value of at least one of an illuminance, a wavelength, and a lighting pattern of the illumination device 200.

The illumination control unit 6 determines an illumination start time on the basis of the alarm setting information held by the alarm setting information management unit 2. The illumination control unit 6 determines a time a certain period (for example, one hour) before the user's wake-up time represented by the alarm setting information to be the illumination start time.

When the current time becomes the illumination start time, the illumination control unit 6 generates a control signal based on the first illumination setting information, and transmits the generated control signal to the illumination device 200 via the communication unit 7. The control signal based on the first illumination setting information is a control signal for gradually changing (for example, increasing) the illuminance of the illumination device 200, or a control signal for gradually changing the wavelength of the illumination device 200. In a case where the terminal state sensing unit 4 senses a motion of the communications terminal 100, the illumination control unit 6 generates a control signal based on the second illumination setting information, and transmits the generated control signal to the illumination device 200 via the communication unit 7. In a case where the terminal state sensing unit 4 senses a motion of the communications terminal 100, the illumination control unit 6 transmits a control signal to the illumination device 200, the control signal causing the illumination state of the illumination device 200 to be set to a setting value included in the second illumination setting information.

The communication unit 7 transmits information to the illumination device 200 and receives information from the illumination device 200. The communication unit 7 transmits a control signal generated by the illumination control unit 6 to the illumination device 200.

In this embodiment, the input unit 1 accepts input of a wake-up time from the user, the alarm setting information management unit 2 holds the user's wake-up time input via the input unit 1 as alarm setting information, and the illumination control unit 6 determines an illumination start time on the basis of the alarm setting information held by the alarm setting information management unit 2, but the present disclosure is not particularly limited thereto. The input unit 1 may accept input of a wake-up time from the user, and the illumination control unit 6 may determine an illumination start time on the basis of the wake-up time accepted by the input unit 1. In this case, the communications terminal 100 need not include the alarm setting information management unit 2 and the alarm control unit 3.

The illumination device 200 includes a communication unit 21 and an operation control unit 22.

The communication unit 21 receives a control signal transmitted by the communications terminal 100.

The operation control unit 22 controls the operation of the illumination device 200 on the basis of the control signal received by the communication unit 21. The operation control unit 22 turns on or off a light source, such as a light-emitting diode (LED), on the basis of the control signal received by the communication unit 21. In a case where a control signal based on the first illumination setting information has been received, the operation control unit 22 gradually changes (for example, increases) the illuminance of the illumination device 200, or gradually changes the wavelength of the illumination device 200. In a case where a control signal based on the second illumination setting information has been received, the operation control unit 22 controls the operation of the illumination device 200 in accordance with a setting value of at least one of an illuminance, a wavelength, and a lighting pattern represented by the control signal.

The illumination control system according to this embodiment includes the communications terminal 100 and the illumination device 200. However, the present disclosure is not particularly limited thereto, and the illumination control system may include, in addition to the communications terminal 100 and the illumination device 200, a server connected to the communications terminal 100 so as to be capable of communicating therewith. In this case, the server may include the alarm setting information management unit 2, the illumination setting information management unit 5, and the illumination control unit 6 illustrated in FIG. 1, and the communications terminal 100 need not include the alarm setting information management unit 2, the illumination setting information management unit 5, and the illumination control unit 6.

The illumination control system according to this embodiment includes one illumination device 200. However, the present disclosure is not particularly limited thereto, and the illumination control system may include a plurality of illumination devices 200. In this case, the communications terminal 100 transmits a control signal to the plurality of illumination devices 200.

Next, the operation of the communications terminal 100 illustrated in FIG. 1 will be described.

Figure 2:
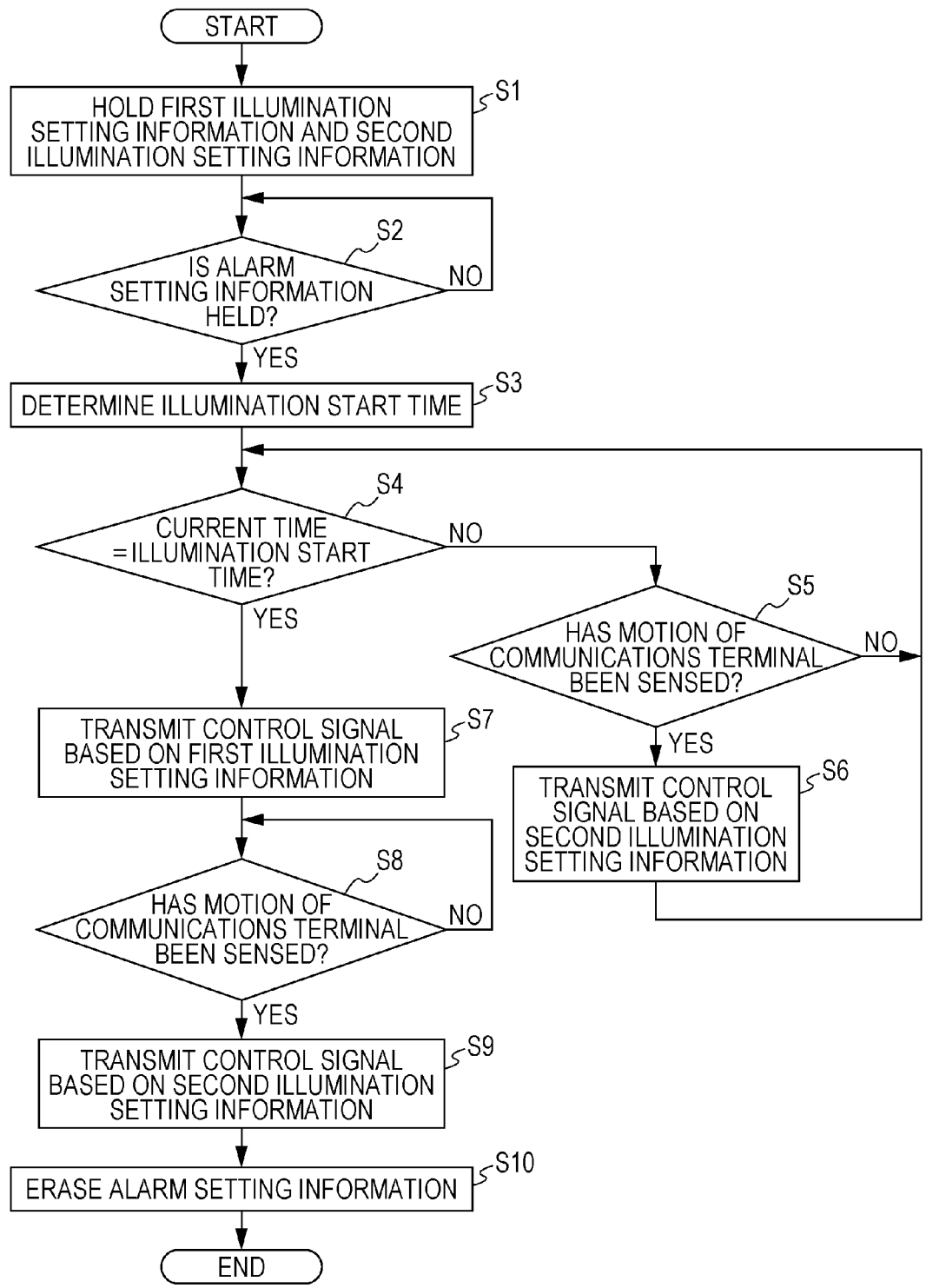
FIG. 2 is a flowchart describing the operation of a communications terminal according to the first embodiment of the present disclosure.

FIG. 2 is a flowchart describing the operation of the communications terminal 100 according to the first embodiment of the present disclosure.

First, in step S1, the illumination setting information management unit 5 holds first illumination setting information and second illumination setting information. Here, the input unit 1 accepts input of the first illumination setting information and the second illumination setting information from the user. The illumination setting information management unit 5 holds the first illumination setting information and the second illumination setting information accepted by the input unit 1.

Figure 3:
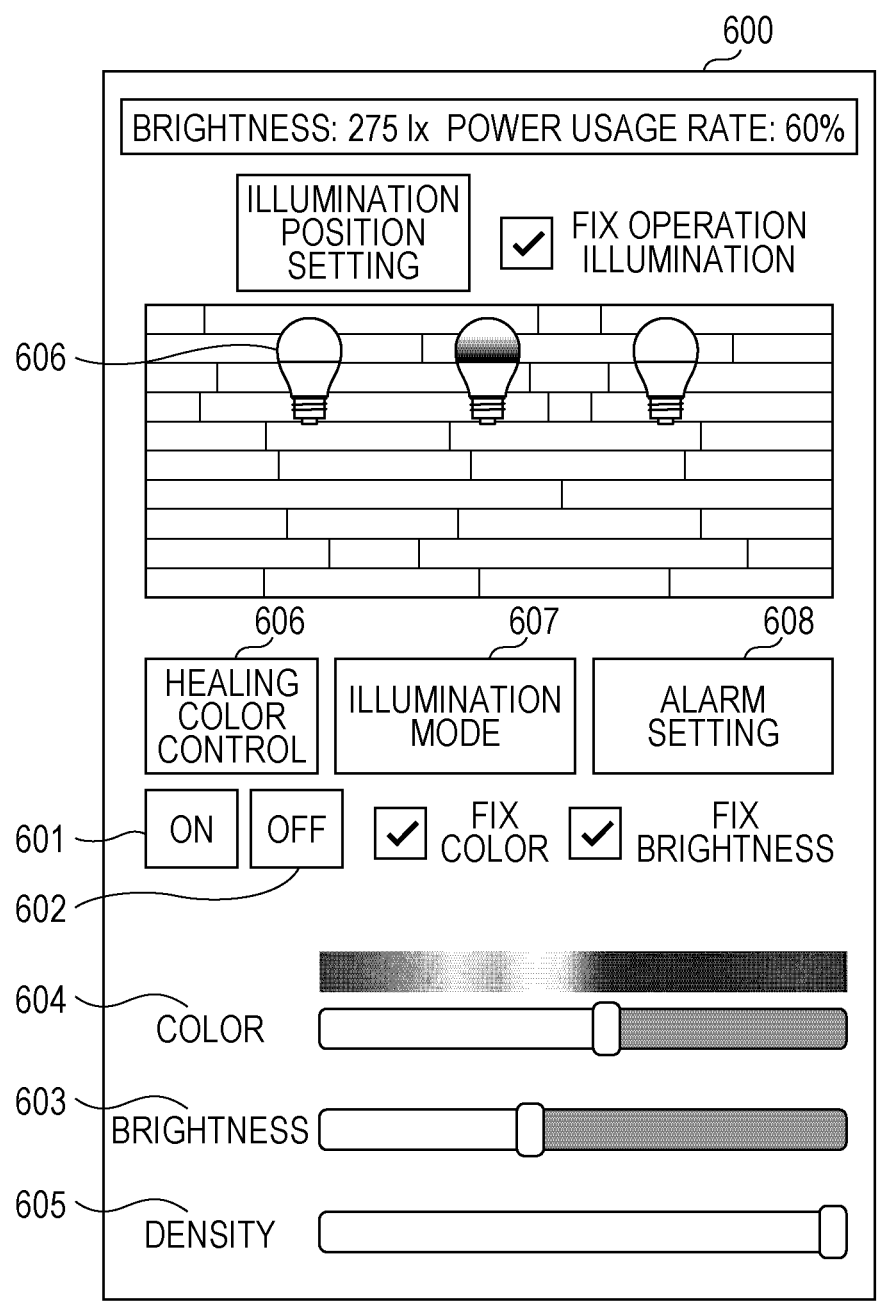
FIG. 3 is a diagram illustrating an example of an illumination setting window for setting second illumination setting information.

FIG. 3 is a diagram illustrating an example of an illumination setting window for setting the second illumination setting information. The illumination setting window 600 illustrated in FIG. 3 includes an ON button 601, an OFF button 602, a brightness adjuster 603, a color adjuster 604, a density adjuster 605, a color control button 606, an illumination mode button 607, an alarm setting button 608, and one or more target illumination device selection buttons 609.

The ON button 601 is used to turn on the illumination device 200. Upon pressing (touching) of the ON button 601, the illumination control unit 6 transmits a control signal for turning on the illumination device 200 to the illumination device 200.

The OFF button 602 is used to turn off the illumination device 200. Upon pressing (touching) of the OFF button 602, the illumination control unit 6 transmits a control signal for turning off the illumination device 200 to the illumination device 200.

The brightness adjuster 603 is used to adjust the brightness (illuminance) of light emitted by the illumination device 200. Upon operating of the brightness adjuster 603, the illumination setting information management unit 5 holds an illuminance of light corresponding to the position indicated by the brightness adjuster 603 as the second illumination setting information. The range of an illuminance of light settable by the input unit 1 is 0 to 100%, 100% corresponding to the maximum illuminance of the illumination device 200.

A method for adjusting the brightness of light is not limited to the method for adjusting the brightness of light in accordance with the position indicated by the brightness adjuster 603. For example, a method for adjusting the brightness of light in accordance with a value of an azimuth, an inclination angle, or a rotation angle that can be acquired by the inclination sensor mounted in the communications terminal 100 may be used.

The color adjuster 604 is used to adjust the color (wavelength) of light emitted by the illumination device 200. Upon operating of the color adjuster 604, the illumination setting information management unit 5 holds a wavelength of light corresponding to the position indicated by the color adjuster 604 as the second illumination setting information.

A method for adjusting the color of light is not limited to the method for adjusting the color of light in accordance with the position indicated by the color adjuster 604. For example, a method for adjusting the color of light in accordance with a value of an azimuth, an inclination angle, or a rotation angle that can be acquired by the inclination sensor mounted in the communications terminal 100 may be used.

The density adjustor 605 is used to adjust the density (wavelength) of light emitted by the illumination device 200. Upon operating of the density adjustor 605, the illumination setting information management unit 5 holds a wavelength of light corresponding to the position indicated by the density adjuster 605 as the second illumination setting information. As a result of adjusting the color and density of light, the wavelength of the light changes. The wavelength of light settable by using the input unit 1 ranges from a wavelength corresponding to purple (for example, 380 nm) to a wavelength corresponding to red (for example, 800 nm).

A method for adjusting the density of light is not limited to the method for adjusting the density of light in accordance with the position indicated by the density adjuster 605. For example, a method for adjusting the density of light in accordance with a value of an azimuth, an inclination angle, or a rotation angle that can be acquired by the inclination sensor mounted in the communications terminal 100 may be used.

The color control button 606 is used to emit light of a preset certain color (wavelength). Upon pressing (touching) of the color control button 606, the illumination control unit 6 transmits a control signal to the illumination device 200, the control signal causing the illumination device 200 to emit light of a preset certain color (wavelength). In FIG. 3, upon selection of the color control button 606, a control signal for emitting light of a wavelength having a healing effect is transmitted to the illumination device 200.

The illumination mode button 607 is used to emit light in a preset illumination mode. Upon pressing (touching) of the illumination mode button 607, an illumination mode setting window is displayed.

Figure 4:
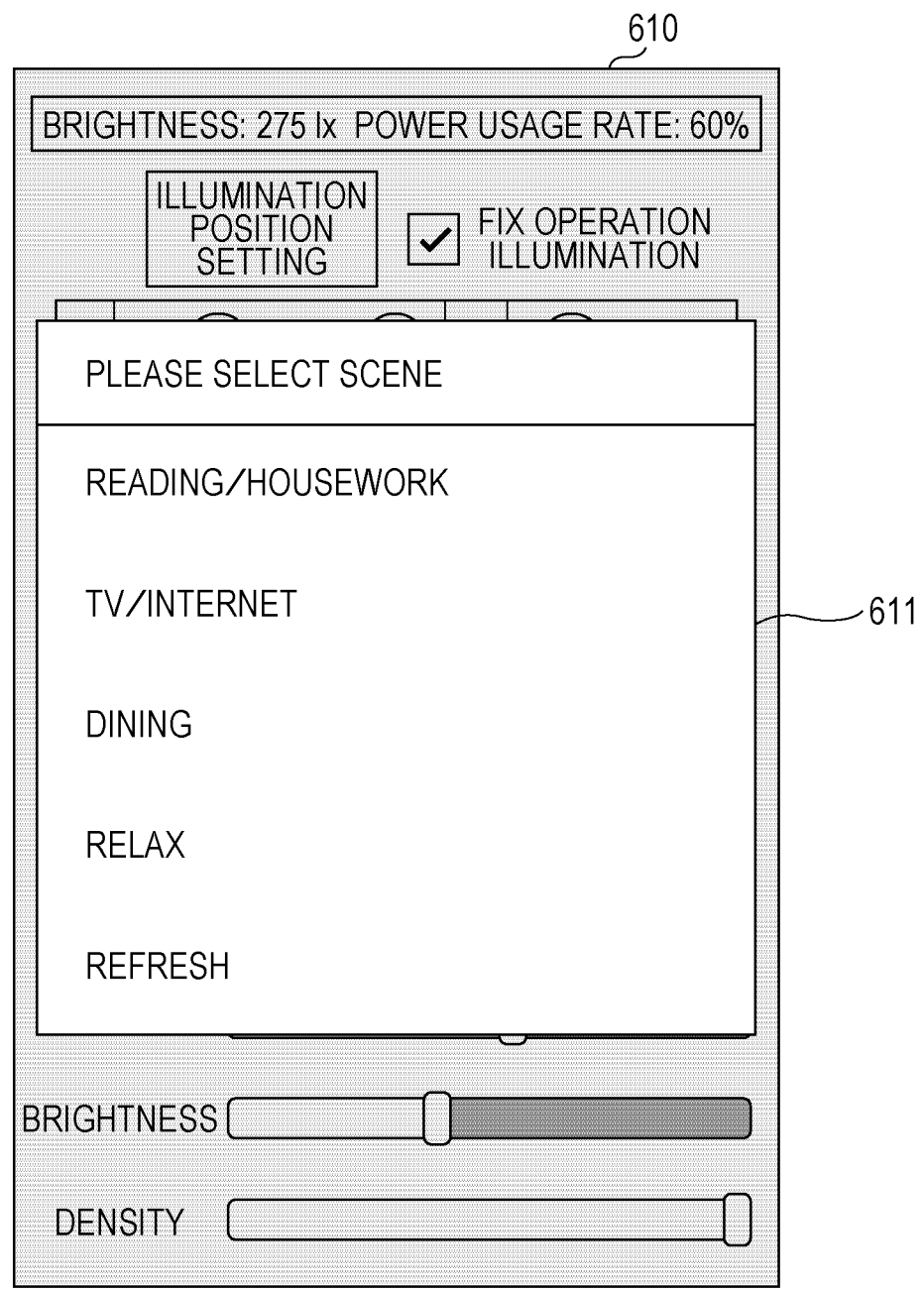
FIG. 4 is a diagram illustrating an example of an illumination mode setting window.

FIG. 4 is a diagram illustrating an example of the illumination mode setting window. As illustrated in FIG. 4, an illumination mode setting window 610 includes a selection image 611 for selecting a desired illumination mode from among a plurality of illumination modes corresponding to situations of the user. The selection image 611 shows a plurality of illumination modes, and the user presses (touches) a desired illumination mode among the plurality of displayed illumination modes. For example, the selection image 611 illustrated in FIG. 4 shows illumination modes "reading/housework", "TV/Internet", "dining", "relax", and "refresh". Setting values of illuminances and wavelengths corresponding to these illumination modes are stored in advance. Upon selection of an illumination mode, the illumination setting information management unit 5 holds the illuminance and wavelength of light corresponding to the selected illumination mode as the second illumination setting information.

The names of such illumination modes and the setting values of the illuminances and wavelengths corresponding to the illumination modes may be set by the user in advance.

Referring back to FIG. 3, the alarm setting button 608 is used to set a time at which the user will wake up. Upon pressing (touching) of the alarm setting button 608, an alarm setting window is displayed.

Each of the target illumination device selection buttons 609 is used to select a target illumination device for which illumination setting information is to be input. Upon pressing (touching) of one of the target illumination device selection buttons 609, the illumination device corresponding to the pressed target illumination device selection button 609 is selected as a target of setting.

A method for selecting one of the target illumination device selection buttons 609 is not limited to the method for pressing (touching) the target illumination device selection button 609. For example, a method for selecting one of the target illumination device selection buttons 609 in accordance with a value of an azimuth, an inclination angle, or a rotation angle that can be acquired by the inclination sensor mounted in the communications terminal 100 may be used.

The number of target illumination device selection buttons 609 corresponds to the number of illumination devices registered in advance as illumination devices for which the setting can be operated on the illumination setting window. In the example illustrated in FIG. 3, three illumination devices are registered as illumination devices for which the setting can be operated on the illumination setting window, and three target illumination device selection buttons 609 are displayed.

Here, a name or image desired by the user may be registered for each of the target illumination device selection buttons 609, and the registered name or image may be displayed in association with the target illumination device selection button 609.

Regarding a position where each of the target illumination device selection buttons 609 is arranged, for example, the user may press (touch) the target illumination device selection button 609 for a certain period (for example, three seconds), and then move the target illumination device selection button 609 while continuously pressing it, thereby moving the target illumination device selection button 609 to a desired position.

Further, for example, a plurality of the target illumination device selection buttons 609 may be simultaneously selected by continuously pressing (touching) them for a certain period (for example, two seconds), so as to collectively set illumination setting information for the plurality of illumination devices.

The first illumination setting information can also be set using setting windows similar to those illustrated in FIGS. 3 and 4.

Figure 5:
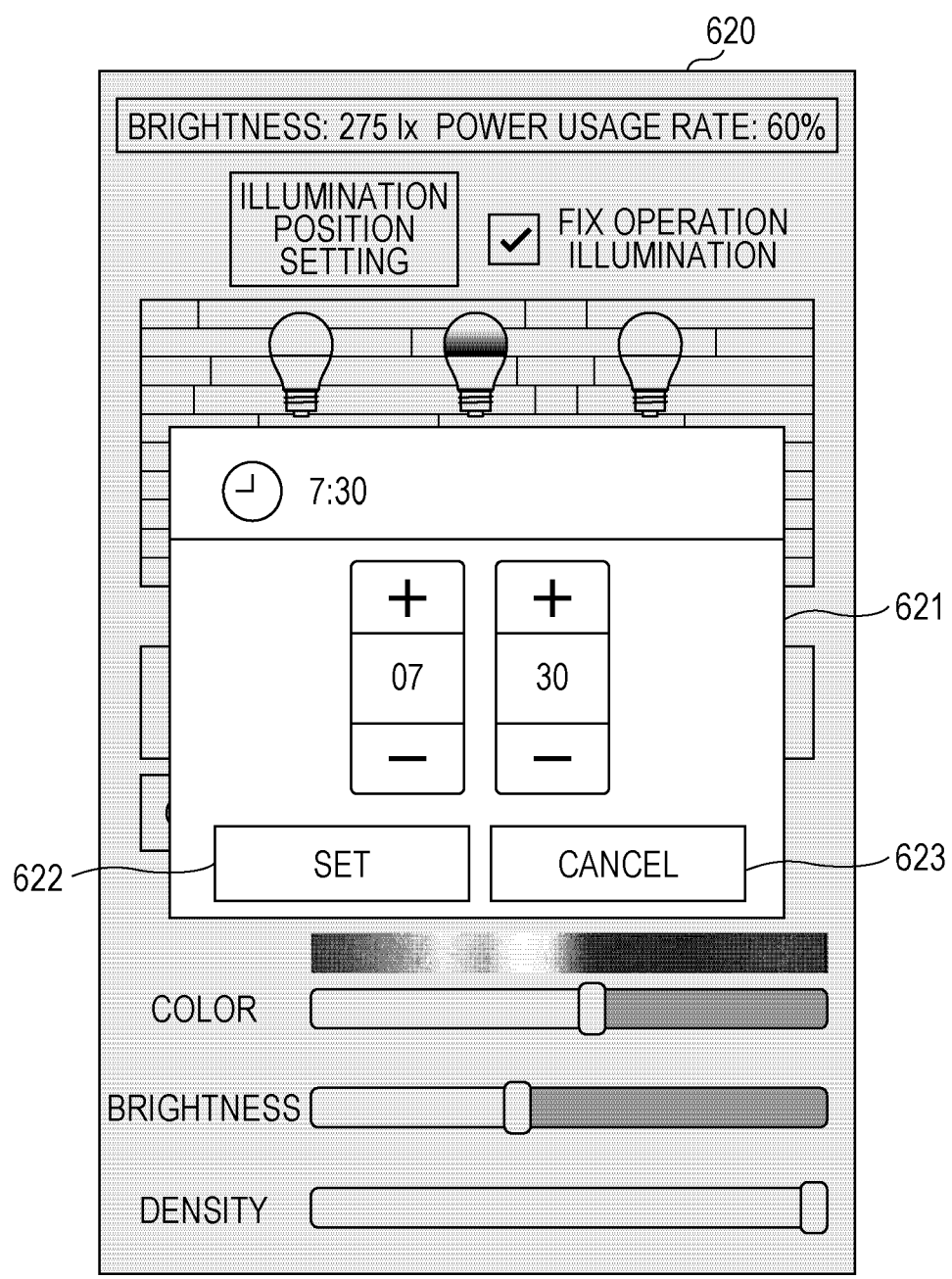
FIG. 5 is a diagram illustrating an example of an alarm setting window.

FIG. 5 is a diagram illustrating an example of an alarm setting window. As illustrated in FIG. 5, an alarm setting window 620 includes a wake-up time input image 621 for inputting a time at which the user will wake up. The wake-up time input image 621 shows a wake-up time, and the user inputs a desired wake-up time. Upon pressing (touching) of a set button 622 after a wake-up time has been input, the alarm setting information management unit 2 holds the input wake-up time as alarm setting information. Upon pressing (touching) of a cancel button 623, input of the wake-up time is canceled, and the illumination setting window 600 illustrated in FIG. 3 is displayed.

Although not illustrated, the user can input a maximum illuminance value, that is, the first illumination setting information. The illumination setting information management unit 5 holds an input maximum illuminance value as the first illumination setting information. The illumination setting information management unit 5 may hold a predetermined maximum illuminance value as the first illumination setting information.

Referring back to FIG. 2, in step S2, the illumination control unit 6 judges whether or not alarm setting information is held by the alarm setting information management unit 2. In a case where it is judged that alarm setting information is not held (NO in step S2), a standby state continues until alarm setting information is held, and step S2 is repeatedly performed.

On the other hand, in a case where it is judged that alarm setting information is held (YES in step S2), the process proceeds to step S3, where the illumination control unit 6 determines an illumination start time on the basis of the alarm setting information. The illumination control unit 6 determines, as an illumination start time, a time a certain period (for example, one hour) before the user's wake-up time represented by the alarm setting information. The determined illumination start time is stored in a memory (not illustrated). The certain period is a period from when the illuminance value of light emitted by the illumination device 200 is 0 to when the illuminance value reaches the maximum illuminance value. The certain period may be a predetermined value, or may be set by the user. Also, the illumination control unit 6 may determine the wake-up time represented by the alarm setting information to be an illumination start time. Also, the illumination control unit 6 may determine an illumination start time on the basis of automatic startup setting information about an electronic device connected to a network. For example, a time a certain period after a power-ON timer start time of an air conditioner is determined to be an illumination start time. In this case, it is not necessary to judge in step S2 whether or not alarm setting information is held. Alternatively, an illumination start time may be set in advance by the user. In this case, it is not necessary to judge in step S2 whether or not alarm setting information is held, and it is not necessary to determine an illumination start time in step S3.

Subsequently, in step S4, the illumination control unit 6 judges whether or not the current time matches the illumination start time. The communications terminal 100 has a clock function and thus the illumination control unit 6 is capable of acquiring the current time. In a case where it is judged that the current time does not match the illumination start time (NO in step S4), the process proceeds to step S5, where the illumination control unit 6 judges whether or not a motion of the communications terminal 100 has been sensed by the terminal state sensing unit 4.

Now, a motion of the communications terminal 100 sensed by the terminal state sensing unit 4 will be described. The terminal state sensing unit 4 senses a motion of the communications terminal 100 caused by an action of the user. A motion of the communications terminal 100 caused by an action of the user is, for example, a motion of the communications terminal 100 when the user picks up the communications terminal 100, or a motion of the communications terminal 100 when the user operates the communications terminal 100. The communications terminal 100 has a vibration function for notifying the user of receipt of something by using vibration. Thus, the terminal state sensing unit 4 needs to sense a motion of the communications terminal 100 caused by an action of the user and vibration of the vibration function by distinguishing them from each other.

Motion data representing a motion of the communications terminal 100 caused by an action of the user and vibration pattern data about the vibration function are represented by, for example, a history of change over a certain period in values of an azimuth, an inclination angle, and a rotation angle that can be acquired by the inclination sensor mounted in the communications terminal 100. Alternatively, motion data representing a motion of the communications terminal 100 caused by an action of the user and vibration pattern data about the vibration function are represented by a history of change over a certain period in values of an azimuth, an inclination angle, and a rotation angle that can be calculated by combining values that can be acquired by a geomagnetic sensor and an acceleration sensor mounted in the communications terminal 100.

Regarding a method for judging a motion of the communications terminal 100 caused by an action of the user, the communications terminal 100 stores a certain number of pieces of vibration pattern data about the vibration function that operates in the communications terminal 100, for example. The terminal state sensing unit 4 judges whether or not the degree of match between motion data representing a motion of the communications terminal 100 caused at certain timing and vibration pattern data that is stored in advance in the communications terminal 100 is lower than or equal to a certain threshold. In a case where the degree of match is lower than or equal to the certain threshold, the terminal state sensing unit 4 judges that the motion of the communications terminal 100 is a motion caused by an action of the user.

Also, the communications terminal 100 accepts input of a certain number of pieces of motion data corresponding to motions of the communications terminal 100 that are daily caused by the user, and stores the accepted pieces of motion data of the communications terminal 100 in the communications terminal 100. The terminal state sensing unit 4 judges whether or not the degree of match between motion data representing a motion of the communications terminal 100 caused at certain timing and motion data stored in the communications terminal 100 is higher than or equal to a certain threshold. In a case where the degree of match is higher than or equal to the certain threshold, the terminal state sensing unit 4 judges that the motion of the communications terminal 100 is a motion caused by an action of the user.

The communication unit 7 may receive, for example, earthquake bulletin information from an earthquake bulletin database, and the terminal state sensing unit 4 may judge that a motion of the communications terminal 100 caused within a certain period from when the earthquake bulletin information is received is not a motion of the communications terminal 100 caused by an action of the user.

For example, a motion of the communications terminal 100 caused by an action of the user is likely to take shorter time than vibration caused by the vibration function or vibration caused by an earthquake. Thus, the terminal state sensing unit 4 may judge that a motion of the communications terminal 100 is a motion caused by an action of the user in a case where the amount of change in value of motion data of the communications terminal 100 becomes a certain threshold or less, or becomes zero within a certain period from when the motion of the communications terminal 100 starts.

For example, in a case where alarm setting information is input by the input unit 1, the alarm control unit 3 may perform control to output only an alarm and not to operate the vibration function at the wake-up time represented by the alarm setting information. Accordingly, vibration generated by the vibration function is not wrongly judged as a motion of the communications terminal 100 caused by an action of the user. As a result, a judgment accuracy for a motion of the communications terminal 100 caused by an action of the user can be enhanced.

The terminal state sensing unit 4 may judge a motion of the communications terminal 100 caused by an action of the user by using the above-described methods in combination.

Further, the operation in step S5 can also be used to determine an illumination start time. While the user is sleeping, it is highly possible that a motion of the communications terminal 100 is not sensed. Further, the user may habitually operate the communications terminal 100 before bedtime. Thus, an illumination start time can be determined on the basis of an elapsed time since a motion of the communications terminal 100 is sensed last time. For example, eight hours after a motion of the communications terminal 100 is sensed last time may be determined to be an illumination start time. In this case, it is not necessary to judge whether or not alarm setting information is held (step S2), and it is not necessary to newly determine an illumination start time (step S3). In a case where it is judged that a motion of the communications terminal 100 has been sensed (YES in step S5), the process proceeds to step S6, where the illumination control unit 6 reads out the second illumination setting information from the illumination setting information management unit 5, generates a control signal based on the read second illumination setting information, and transmits the generated control signal based on the second illumination setting information to the illumination device 200 via the communication unit 7. The communication unit 21 of the illumination device 200 receives the control signal based on the second illumination setting information. The operation control unit 22 emits light in accordance with the control signal that is based on the second illumination setting information and that has been received by the communication unit 21.

The second illumination setting information represents a setting value of at least one of an illuminance, a wavelength, and a lighting pattern of the illumination device 200 after awakening. Thus, the operation control unit 22 emits light in accordance with a setting value of at least one of the illuminance, wavelength, and lighting pattern.

In a case where the control signal based on the second illumination setting information is transmitted to the illumination device 200 in step S6, or in a case where it is judged in step S5 that a motion of the communications terminal 100 has not been sensed (NO in step S5), the process returns to step S4.

In a case where the control signal based on the second illumination setting information is transmitted to the illumination device 200 in step S6, the illumination device 200 lights up in accordance with the control signal based on the second illumination setting information. For example, in a case where the user wakes up at midnight and picks up the communications terminal 100, a motion of the communications terminal 100 is sensed before the illumination start time. In such a case, the control signal based on the second illumination setting information is transmitted to the illumination device 200, and the illumination device 200 lights up in accordance with the control signal based on the second illumination setting information. After that, the illumination device 200 is turned off when the user goes to bed again. That is, after step S6 has been performed and the illumination device 200 has been turned on, the illumination device 200 is turned off by the user.

After step S6, a process of judging whether or not the illumination device 200 has been turned off by the user may be performed. In this case, the communication unit 21 of the illumination device 200 transmits a signal indicating that the illumination device 200 has been turned off to the communications terminal 100, and the communication unit 7 of the communications terminal 100 receives the signal indicating that the illumination device 200 has been turned off. The illumination control unit 6 judges whether or not the signal indicating that the illumination device 200 has been turned off has been received. In a case where the signal indicating that the illumination device 200 has been turned off has been received, the process proceeds to step S4. In a case where the signal indicating that the illumination device 200 has been turned off has not been received, a standby state occurs, and the judgment is repeatedly performed until the signal indicating that the illumination device 200 has been turned off is received.

The illumination control unit 6 transmits the control signal based on the second illumination setting information to the illumination device 200 in step S6, but the present disclosure is not particularly limited thereto. Alternatively, the illumination control unit 6 may transmit a control signal based on certain illumination setting information, which is different from the first illumination setting information and the second illumination setting information, to the illumination device 200 in step S6. The certain illumination setting information is information for illuminating a space in a case where the user wakes up before the illumination start time. For example, the certain illumination setting information includes an illuminance of 0 (no illumination) to 50% of the maximum illuminance of the illumination device 200. In this case, the certain illumination setting information is held by the illumination setting information management unit 5 in step S1.

Instead of sensing a motion other than a motion of the communications terminal 100 caused by an action of the user, the terminal state sensing unit 4 may sense a motion of the communications terminal 100 in accordance with a trigger of the motion in step S5, and may transmit a control signal based on illumination setting information other than the second illumination setting information corresponding to the trigger to the illumination device 200 in step S6. For example, in a case where the communications terminal 100 receives a mail or a call, the communications terminal 100 makes a motion of a certain pattern (for example, vibrates). Accordingly, the terminal state sensing unit 4 senses the motion of the certain pattern of the communications terminal 100 in step S5, and the illumination control unit 6 transmits a control signal based on illumination setting information corresponding to the certain motion pattern to the illumination device 200. In this case, the relationship between the trigger of the motion of the communications terminal 100 and the illumination setting information related to step S6 is stored in a memory of the communications terminal 100. Also, the illumination setting information related to step S6 is held by the illumination setting information management unit 5 in step S1.

In a case where it is judged in step S4 that the current time matches the illumination start time (YES in step S4), the process proceeds to step S7, where the illumination control unit 6 reads out the first illumination setting information from the illumination setting information management unit 5, generates a control signal based on the read first illumination setting information, and transmits the generated control signal based on the first illumination setting information to the illumination device 200 via the communication unit 7. The communication unit 21 of the illumination device 200 receives the control signal based on the first illumination setting information. The operation control unit 22 emits light in accordance with the control signal that is based on the first illumination setting information and that has been received by the communication unit 21.

The operation control unit 22 gradually changes the illuminance from 0 to the maximum illuminance value represented by the first illumination setting information during a period from the illumination start time to the wake-up time. The illuminance of the illumination device 200 linearly changes from 0 to the maximum illuminance value, but the present disclosure is not limited thereto, and the illuminance of the illumination device 200 may curvilinearly change from 0 to the maximum illuminance value. Further, the first illumination setting information may include information indicating how the illuminance is to be changed.

Subsequently, in step S8, the illumination control unit 6 judges whether or not a motion of the communications terminal 100 has been sensed by the terminal state sensing unit 4. The operation performed in step S8 is the same as that performed in step S5. Here, in a case where it is judged that a motion of the communications terminal 100 has not been sensed (NO in step S8), a standby state continues until a motion of the communications terminal 100 is sensed, and step S8 is repeatedly performed.

On the other hand, in a case where it is judged that a motion of the communications terminal 100 has been sensed (YES in step S8), the process proceeds to step S9, where the illumination control unit 6 reads out the second illumination setting information from the illumination setting information management unit 5, generates a control signal based on the read second illumination setting information, and transmits the generated control signal based on the second illumination setting information to the illumination device 200 via the communication unit 7.

Subsequently, in step S10, the alarm setting information management unit 2 erases the alarm setting information stored therein. In this way, in a case where the time at which the control signal based on the second illumination setting information is transmitted to the illumination device 200 is before the illumination start time, the alarm setting information management unit 2 keeps holding the alarm setting information. In a case where the time at which the control signal based on the second illumination setting information is transmitted to the illumination device 200 is after the illumination start time, the alarm setting information management unit 2 erases the alarm setting information.

As described above, in a case where a motion of the communications terminal 100 is sensed, a control signal based on the second illumination setting information that is used to set an illumination state of the illumination device 200 in a space after the user wakes up is transmitted to the illumination device 200. Accordingly, with the motion of the communications terminal 100, it can be easily detected that the user has woken up, and the illumination device 200 can be easily controlled after the user has woken up.

Second Embodiment

Figure 6:
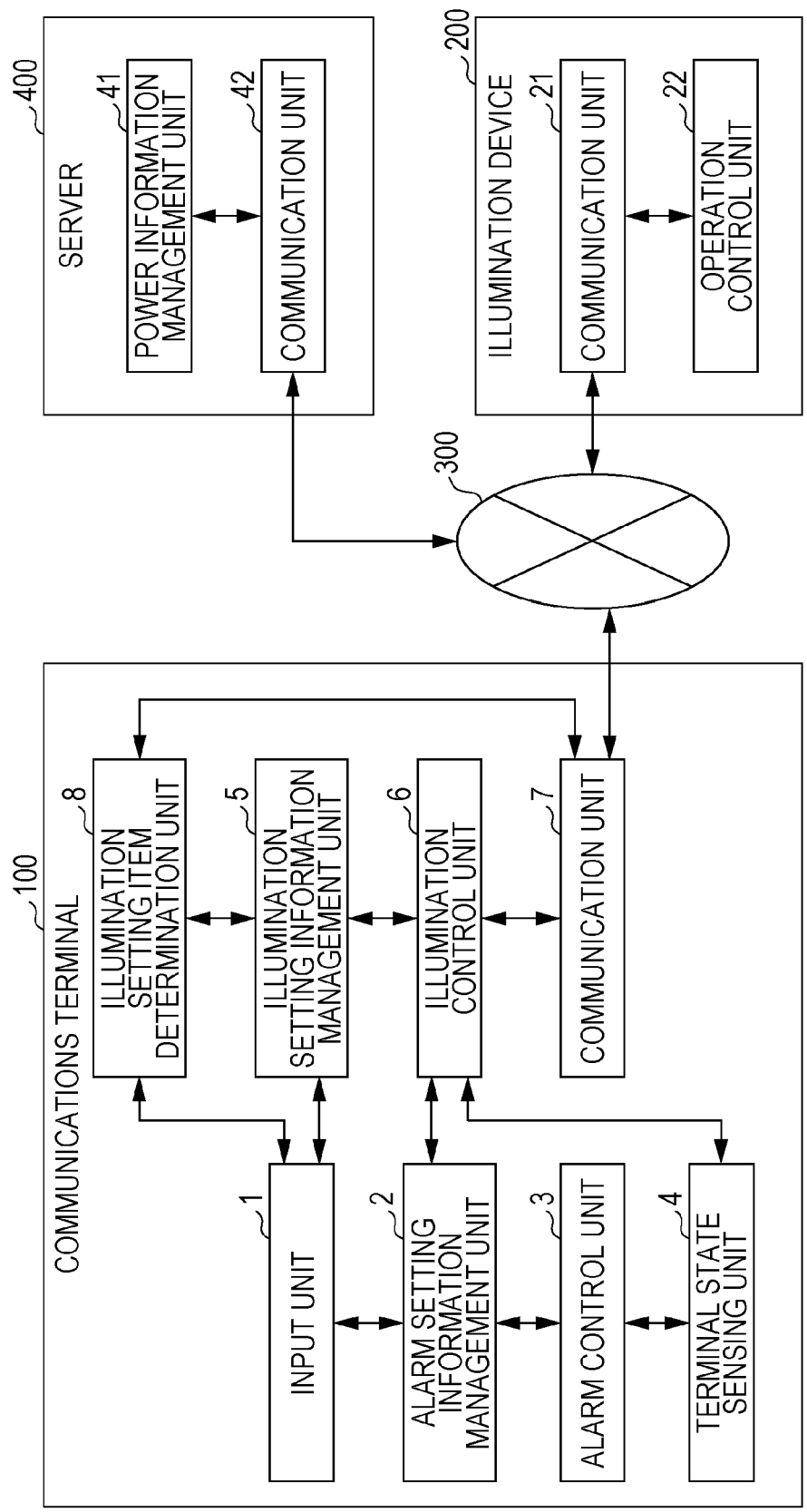
FIG. 6 is a diagram illustrating the configuration of an illumination control system according to a second embodiment of the present disclosure.

FIG. 6 is a diagram illustrating the configuration of an illumination control system according to a second embodiment of the present disclosure. The illumination control system illustrated in FIG. 6 includes the communications terminal 100, the illumination device 200, and a server 400. In the illumination control system according to the second embodiment, the same parts as those of the illumination control system according to the first embodiment are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, the communication unit 7, and an illumination setting item determination unit 8. The illumination device 200 includes the communication unit 21 and the operation control unit 22. The server 400 is connected to the communications terminal 100 via the network 300 so as to be capable of communicating with the communications terminal 100. The server 400 includes a power information management unit 41 and a communication unit 42.

The power information management unit 41 of the server 400 manages power usage information representing the power usage in an area in which the illumination device 200 is provided, and electricity fee information representing the electricity fees in individual certain time slots in the area in which the illumination device 200 is provided.

The communication unit 42 transmits the power usage information or the electricity fee information managed by the power information management unit 41 to the communications terminal 100.

The communication unit 7 of the communications terminal 100 receives the power usage information or the electricity fee information transmitted by the server 400.

The illumination setting item determination unit 8 determines the range of an illuminance settable in the communications terminal 100 or the range of a wavelength settable in the communications terminal 100, on the basis of the power usage information or the electricity fee information received by the communication unit 7. Here, as the power usage represented by the power usage information increases, or the electricity fee represented by the electricity fee information increases, the illumination setting item determination unit 8 decreases the upper limit value of a settable illuminance, or makes it possible to set only a wavelength corresponding to a color expressed by a single light source, such as red, blue, or green, for example. As the power usage represented by the power usage information decreases, or the electricity fee represented by the electricity fee information decreases, the illumination setting item determination unit 8 increases the upper limit value of a settable illuminance, or makes it possible to set a wavelength corresponding to a color expressed by a plurality of light sources, such as white, yellow, or purple, for example.

The correspondence between the power usage information or the electricity fee information, and the range of an illuminance or wavelength may be set by the user in advance.

The input unit 1 accepts input of an illuminance or a wavelength within the range determined by the illumination setting item determination unit 8.

The server 400 may transmit only any one of the power usage information and the electricity fee information to the communications terminal 100, and the communications terminal 100 may receive only any one of the power usage information and the electricity fee information transmitted by the server 400. The server 400 may transmit both of the power usage information and the electricity fee information to the communications terminal 100, and the communications terminal 100 may receive both of the power usage information and the electricity fee information transmitted by the server 400. In this case, the illumination setting item determination unit 8 determines the range of an illuminance or wavelength in consideration of both of the received power usage information and electricity fee information.

The second embodiment is the same as the first embodiment except that the range of an illuminance or wavelength settable in the communications terminal 100 is determined on the basis of power usage information or electricity fee information, and thus any more detailed description is omitted.

The alarm setting information management unit 2, the illumination setting information management unit 5, the illumination control unit 6, and the illumination setting item determination unit 8 illustrated in FIG. 6 may be provided in a server that is different from the server 400 and is connected to the communications terminal 100 so as to be capable of communicating with the communications terminal 100, not in the communications terminal 100.

Third Embodiment

Figure 7:
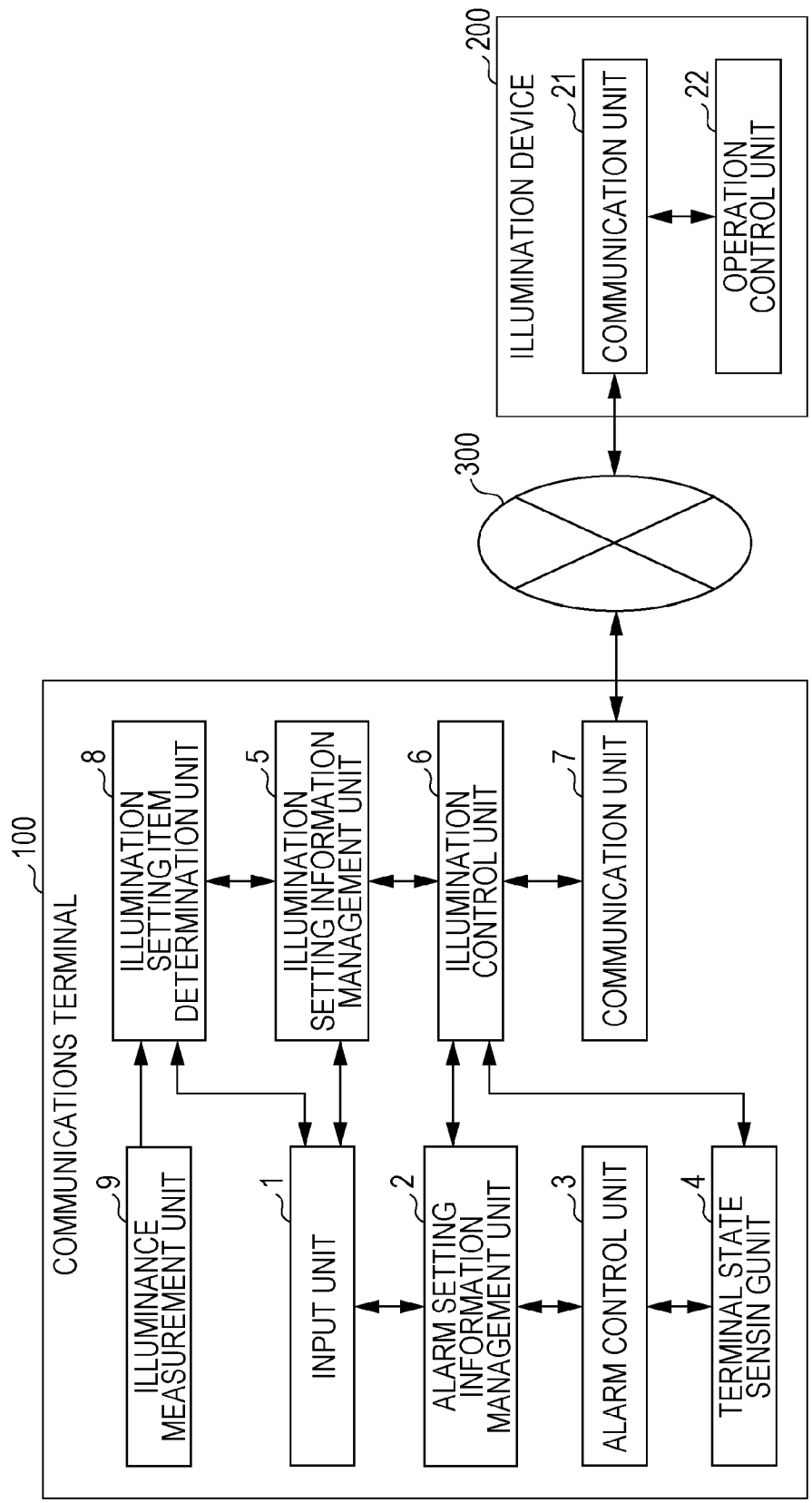
FIG. 7 is a diagram illustrating the configuration of an illumination control system according to a third embodiment of the present disclosure.

FIG. 7 is a diagram illustrating the configuration of an illumination control system according to a third embodiment of the present disclosure. The illumination control system illustrated in FIG. 7 includes the communications terminal 100 and the illumination device 200. In the illumination control system according to the third embodiment, the same parts as those in the illumination control systems according to the first and second embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, the communication unit 7, the illumination setting item determination unit 8, and an illuminance measurement unit 9. The illumination device 200 includes the communication unit 21 and the operation control unit 22.

The illuminance measurement unit 9 measures an illuminance around the illumination device 200. The illuminance measurement unit 9 measures, for example, an illuminance around the illumination device 200 at a user's wake-up time.

The illumination setting item determination unit 8 determines the range of an illuminance settable in the communications terminal 100, or the range of a wavelength settable in the communications terminal 100, on the basis of an ambient illuminance measured by the illuminance measurement unit 9. Here, as the ambient illuminance measured by the illuminance measurement unit 9 increases, the illumination setting item determination unit 8 decreases the upper limit value of a settable illuminance, or makes it possible to set only a wavelength corresponding to a color of low density. As the ambient illuminance measured by the illuminance measurement unit 9 decreases, the illumination setting item determination unit 8 increases the upper limit value of a settable illuminance, or makes it possible to set a wavelength corresponding to a color of high density.

The correspondence between an ambient illuminance and the range of an illuminance or wavelength may be set by the user in advance.

The input unit 1 accepts input of an illuminance or a wavelength within the range determined by the illumination setting item determination unit 8.

In the third embodiment, the communications terminal 100 includes the illuminance measurement unit 9, but the present disclosure is not limited thereto. Alternatively, the illumination device 200 may include the illuminance measurement unit 9. Alternatively, an electric device other than the communications terminal 100 and the illumination device 200 may include the illuminance measurement unit 9 as long as the electric device exists within a space illuminated by the illumination device 200. Alternatively, the illumination control system may include an illuminance measurement device for measuring the illuminance of the illumination device 200.

The third embodiment is the same as the first embodiment except that the upper limit value of an illuminance settable in the communications terminal 100 is determined on the basis of an ambient illuminance measured by the illuminance measurement unit 9, and thus any more detailed description is omitted.

The alarm setting information management unit 2, the illumination setting information management unit 5, the illumination control unit 6, and the illumination setting item determination unit 8 illustrated in FIG. 7 may be provided in a server connected to the communications terminal 100 so as to be capable of communicating with the communications terminal 100, not in the communications terminal 100.

Fourth Embodiment

Figure 8:
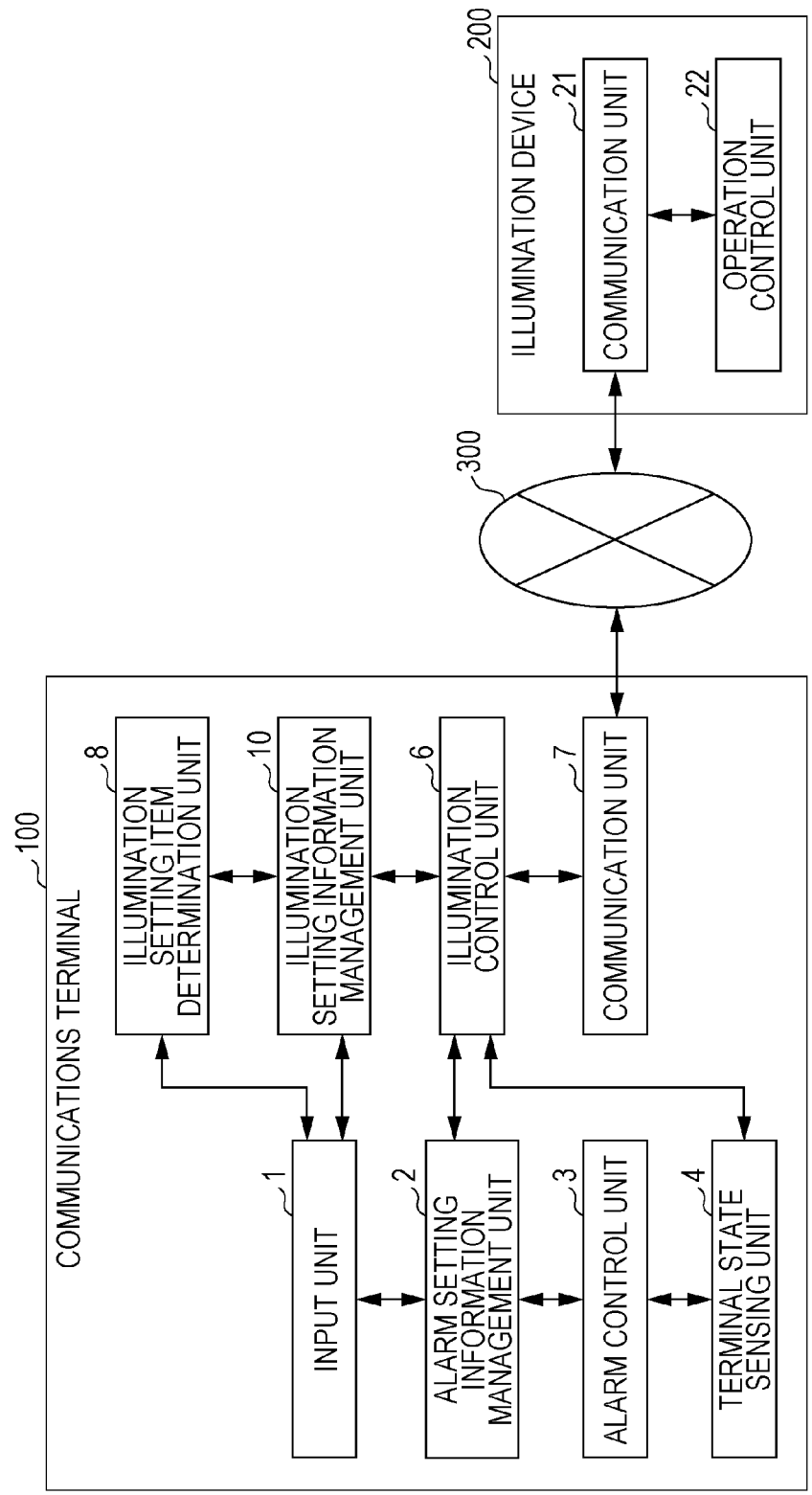
FIG. 8 is a diagram illustrating the configuration of an illumination control system according to a fourth embodiment of the present disclosure.

FIG. 8 is a diagram illustrating the configuration of an illumination control system according to a fourth embodiment of the present disclosure. The illumination control system illustrated in FIG. 8 includes the communications terminal 100 and the illumination device 200. In the illumination control system according to the fourth embodiment, the same parts as those in the illumination control systems according to the first to third embodiments are denoted by the same reference numerals, and the description thereof is omitted.

The communications terminal 100 includes the input unit 1, the alarm setting information management unit 2, the alarm control unit 3, the terminal state sensing unit 4, the illumination control unit 6, the communication unit 7, the illumination setting item determination unit 8, and an illumination setting information management unit 10. The illumination device 200 includes the communication unit 21 and the operation control unit 22.

The input unit 1 accepts setting of an illumination mode from the user. The illumination mode is set by using, for example, the illumination mode setting window 610 illustrated in FIG. 4. The input unit 1 accepts setting of a desired illumination mode corresponding to a situation of the user among a plurality of illumination modes representing situations of the user. As illustrated in FIG. 4, an illumination mode corresponding to a situation of the user, for example, "reading/housework", "TV/Internet", "dining", "relax", or "refresh" is set.

The illumination setting item determination unit 8 determines the range of an illuminance settable in the communications terminal 100 or the range of a wavelength settable in the communications terminal 100, on the basis of the illumination mode accepted by the input unit 1. Each illumination mode is associated with the range of an illuminance settable in the communications terminal 100 or the range of a wavelength settable in the communications terminal 100. A memory of the communications terminal 100 (not illustrated) stores, in advance, a table in which illumination modes are associated with the ranges of illuminances settable in the communications terminal 100 and the ranges of wavelengths settable in the communications terminal 100. The illumination setting item determination unit 8 determines, using the table stored in the memory in advance, the range of an illuminance or the range of a wavelength corresponding to the illumination mode accepted by the input unit 1.

The correspondence between the illumination modes and the ranges of illuminances or wavelengths may be set by the user in advance.

The input unit 1 accepts input of an illuminance so that the illuminance is within the range determined by the illumination setting item determination unit 8, and also accepts input of a wavelength so that the wavelength is within the range determined by the illumination setting item determination unit 8.

In a case where an illumination mode has been set, the illumination setting information management unit 10 holds, as the second illumination setting information, the illuminance and wavelength that have been set so as to be within the range of an illuminance or the range of a wavelength determined by the illumination setting item determination unit 8.

The fourth embodiment is the same as the first embodiment except that the range of an illuminance settable in the communications terminal 100 or the range of a wavelength settable in the communications terminal 100 is determined on the basis of an illumination mode, and thus any more detailed description is omitted.

In this embodiment, the illumination setting item determination unit 8 determines any one of the range of an illuminance settable in the communications terminal 100 and the range of a wavelength settable in the communications terminal 100, but the present disclosure is not limited thereto. Alternatively, the illumination setting item determination unit 8 may determine both of the range of an illuminance settable in the communications terminal 100 and the range of a wavelength settable in the communications terminal 100.

The alarm setting information management unit 2, the illumination setting information management unit 10, the illumination control unit 6, and the illumination setting item determination unit 8 illustrated in FIG. 8 may be included in a server connected to the communications terminal 100 so as to be capable of communicating with the communications terminal 100, not in the communications terminal 100.

Fifth Embodiment

Figure 9:
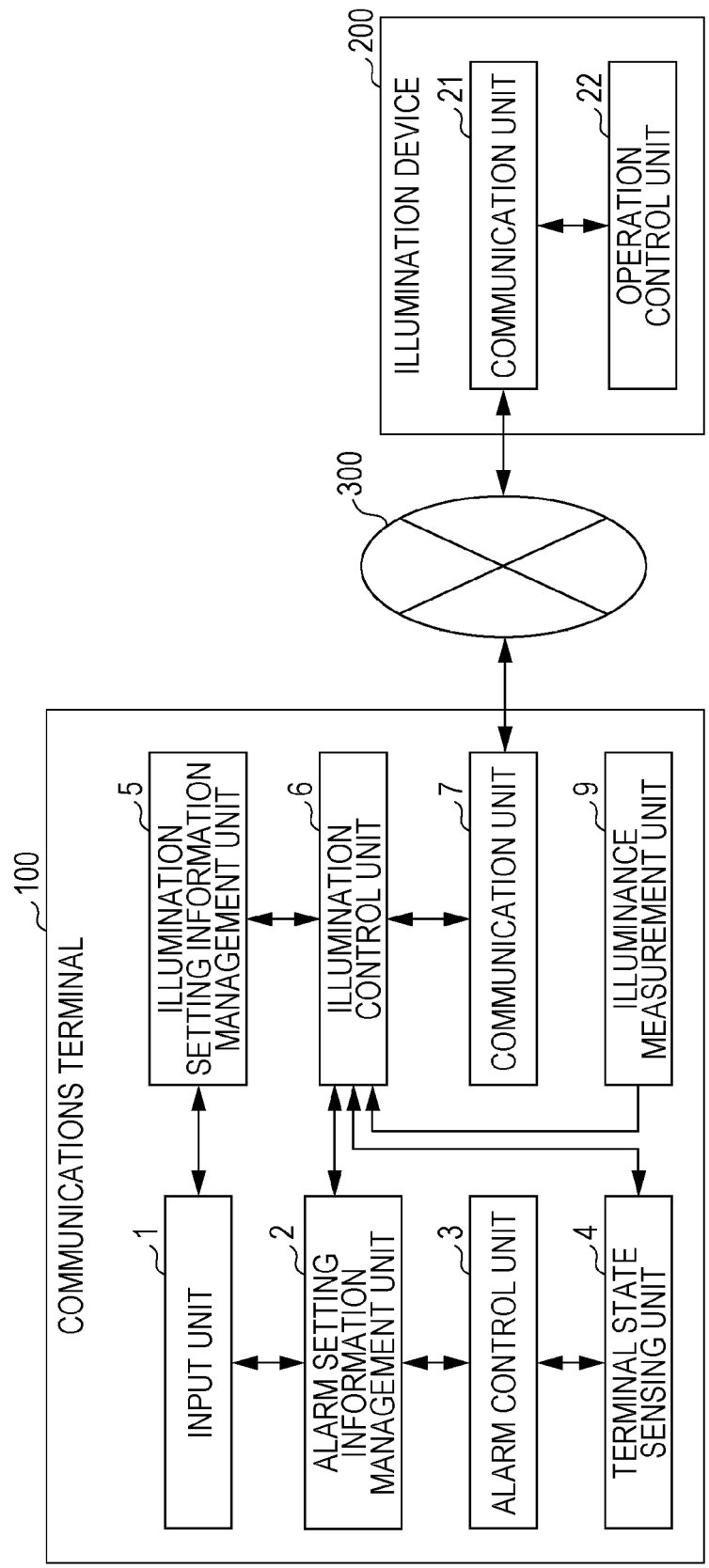
FIG. 9 is a diagram illustrating the configuration of an illumination control system according to a fifth embodiment of the present disclosure.

FIG. 9 is a diagram illustrating the configuration of an illumination control system according to a fifth embodiment of the present disclosure. The illumination control system illustrated in FIG. 9 includes the communications terminal 100 and the illumination device 200. In the illumination control system according to the fifth embodiment, the same parts as those in the illumination control systems according to the first to fourth embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, the communication unit 7, and the illuminance measurement unit 9. The illumination device 200 includes the communication unit 21 and the operation control unit 22.

The illuminance measurement unit 9 measures an illuminance around the illumination device 200. The illuminance measurement unit 9 measures, for example, an illuminance around the illumination device 200 at a user's wake-up time.

The input unit 1 accepts setting of an illumination mode from the user. The illumination mode is set by using, for example, the illumination mode setting window 610 illustrated in FIG. 4. The input unit 1 accepts setting of a desired illumination mode corresponding to a situation of the user among a plurality of illumination modes representing situations of the user. As illustrated in FIG. 4, an illumination mode corresponding to a situation of the user, for example, "reading/housework", "TV/Internet", "dining", "relax", or "refresh" is set.

The illumination control unit 6 determines the illuminance or wavelength included in the second illumination setting information on the basis of the ambient illuminance measured by the illuminance measurement unit 9 and the illumination mode accepted by the input unit 1. An illuminance or wavelength is associated with each combination of an illumination mode and an ambient illuminance. The memory of the communications terminal 100 (not illustrated) stores, in advance, a table in which illumination modes, ambient illuminances, and illuminances or wavelengths are associated with one another. The illumination control unit 6 determines the illuminance or wavelength corresponding to the ambient illuminance measured by the illuminance measurement unit 9 and the illumination mode accepted by the input unit 1, by using the table stored in the memory in advance.

The correspondence among the illumination modes, ambient illuminances, and illuminances or wavelengths may be set by the user in advance.

The illuminance control unit 6 stores the determined illuminance or wavelength as the second illumination setting information in the illumination setting information management unit 5.

The fifth embodiment is the same as the first embodiment except that the illuminance or wavelength included in the second illumination setting information is determined on the basis of an ambient illuminance and an illumination mode, and thus any more detailed description is omitted.

In this embodiment, the illumination control unit 6 determines any one of an illuminance and a wavelength, but the present disclosure is not limited thereto. Alternatively, the illumination control unit 6 may determine both of an illuminance and a wavelength.

Sixth Embodiment

Figure 10:
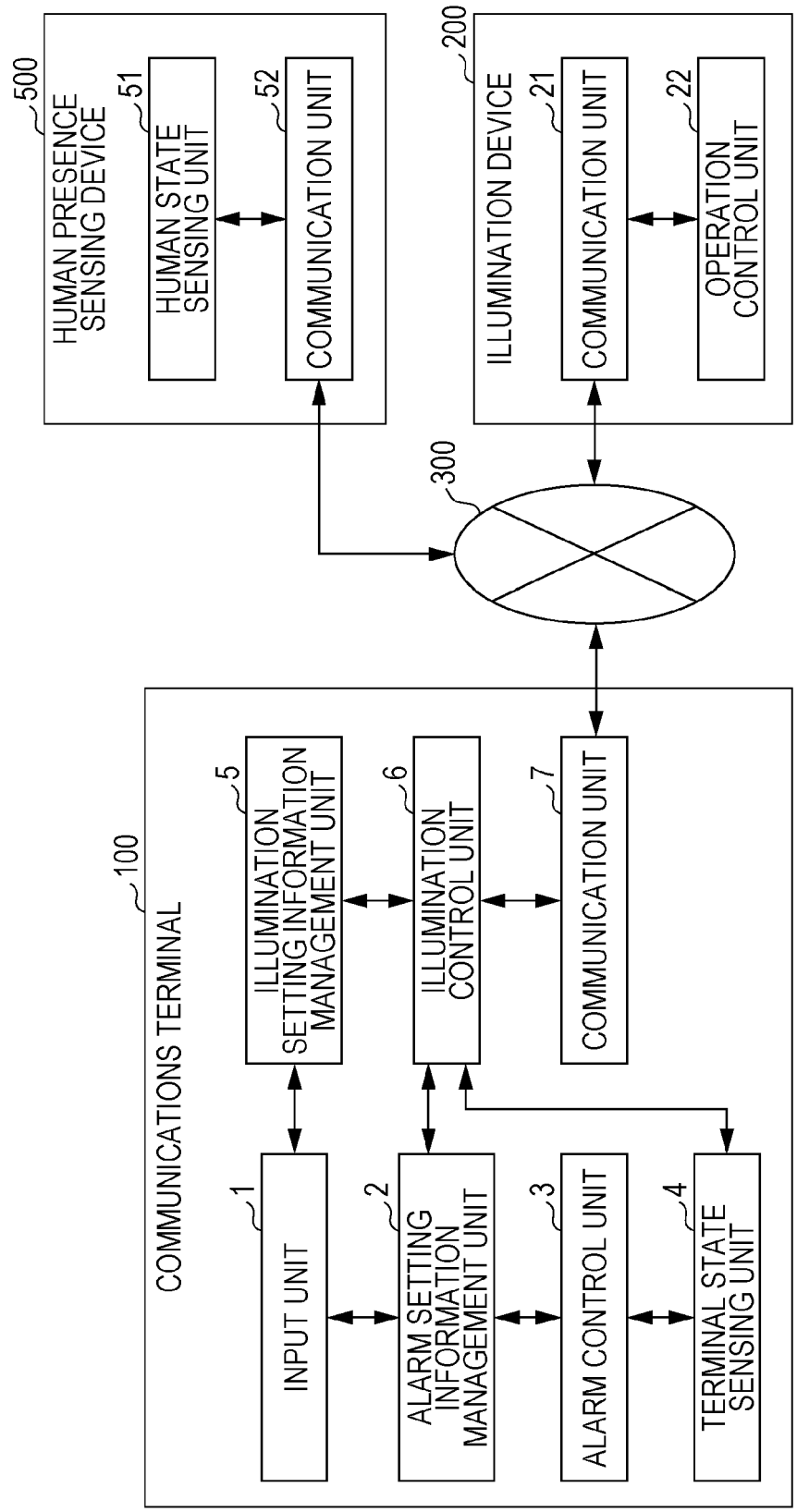
FIG. 10 is a diagram illustrating the configuration of an illumination control system according to a sixth embodiment of the present disclosure.

FIG. 10 is a diagram illustrating the configuration of an illumination control system according to a sixth embodiment of the present disclosure. The illumination control system illustrated in FIG. 10 includes the communications terminal 100, the illumination device 200, and a human presence sensing device 500. In the illumination control system according to the sixth embodiment, the same parts as those in the illumination control systems according to the first to fifth embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, and the communication unit 7. The illumination device 200 includes the communication unit 21 and the operation control unit 22.

The human presence sensing device 500 is connected to the communications terminal 100 via the network 300 so as to be capable of communicating with the communications terminal 100. The human presence sensing device 500 includes a human state sensing unit 51 and a communication unit 52.

The human state sensing unit 51 senses sleeping states of a plurality of users in a space illuminated by the illumination device 200. For example, the human state sensing unit 51 includes a plurality of thermal image cameras that sense changes in an amount of infrared emitted by users and that are provided for the individual users. The human state sensing unit 51 analyzes images output from the plurality of thermal image cameras, identifies the differences between sleeping body temperatures and waking body temperatures of the individual users, and judges whether or not the individual users are sleeping. The images acquired from the individual thermal image cameras are associated with the individual users, and the sleeping states of the individual users can be sensed.

The communication unit 52 transmits the sleeping states of the plurality of users sensed by the human state sensing unit 51 to the communications terminal 100.

The communication unit 7 of the communications terminal 100 receives the sleeping states of the plurality of users transmitted by the human presence sensing device 500.

When sensing a motion of the communications terminal 100, the illumination control unit 6 judges whether or not another user existing in the same space as the user who owns the communications terminal 100 is sleeping. At this time, the illumination control unit 6 judges whether or not another user is sleeping in accordance with the sleeping states of the individual users received by the communication unit 7.

The illumination control unit 6 causes the illuminance, wavelength, or lighting pattern included in the second illumination setting information in a case where it is judged that another user is sleeping to be different from that in a case where it is judged that another user is not sleeping. For example, in a case where it is judged that another user is not sleeping, the illumination control unit 6 generates a control signal based on the illuminance included in the second illumination setting information. On the other hand, in a case where it is judged that another user is sleeping, the illumination control unit 6 generates a control signal based on an illuminance lower than the illuminance included in the second illumination setting information.

Also, for example, in a case where it is judged that another user is not sleeping, the illumination control unit 6 generates a control signal based on the wavelength included in the second illumination setting information. On the other hand, in a case where it is judged that another user is sleeping, the illumination control unit 6 generates a control signal based on a wavelength larger than the wavelength included in the second illumination setting information.

Alternatively, in a case where it is judged that another user is sleeping, the illumination control unit 6 may generate a control signal for causing the illumination device 200 to light up for a certain period and to be turned off after the certain period has elapsed, as a control signal based on the second illumination setting information, and transmit the control signal.

The illuminance, wavelength, or lighting pattern for a case where it is judged that another user is sleeping may be set by the user in advance.

The sixth embodiment is the same as the first embodiment except that the illuminance, wavelength, or lighting pattern included in the second illumination setting information in a case where it is judged that another user is sleeping is different from that in a case where it is judged that another user is not sleeping, and thus any more detailed description is omitted.

Seventh Embodiment

Figure 11:
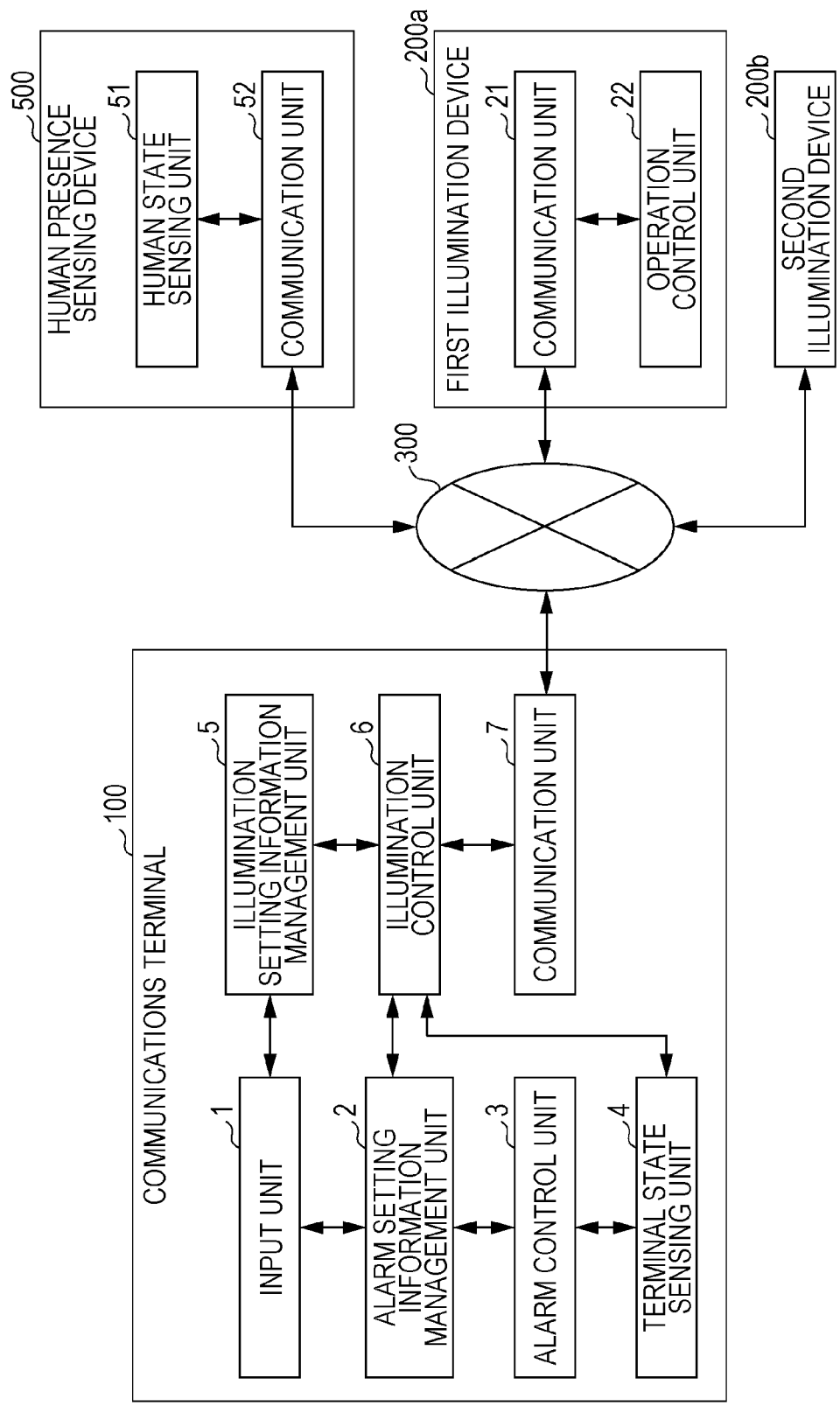
FIG. 11 is a diagram illustrating the configuration of an illumination control system according to a seventh embodiment of the present disclosure.

FIG. 11 is a diagram illustrating the configuration of an illumination control system according to a seventh embodiment of the present disclosure. The illumination control system illustrated in FIG. 11 includes the communications terminal 100, a first illumination device 200a, a second illumination device 200b, and the human presence sensing device 500. In the illumination control system according to the seventh embodiment, the same parts as those in the illumination control systems according to the first to sixth embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, and the communication unit 7. The first illumination device 200a illuminates a first user. The first illumination device 200a includes the communication unit 21 and the operation control unit 22. The second illumination device 200b illuminates a second user who is in the same space as the first user. The configuration of the second illumination device 200b is the same as the first illumination device 200a, and thus the description thereof is omitted.

The human presence sensing device 500 is connected to the communications terminal 100 via the network 300 so as to be capable of communicating with the communications terminal 100. The human presence sensing device 500 includes the human state sensing unit 51 and the communication unit 52.

The human state sensing unit 51 senses the sleeping states of the first and second users in the spaces illuminated by the illumination devices 200a and 200b. For example, the human state sensing unit 51 includes first and second thermal image cameras that are provided for the first and second users and that sense changes in amounts of infrared emitted from the individual users. The human state sensing unit 51 analyzes the images output from the first and second thermal image cameras, identifies the differences between sleeping body temperatures and waking body temperatures of the individual users, and judges whether or not the individual users are sleeping. The images acquired from the individual thermal image cameras are associated with the individual users, and the sleeping states of the individual users can be sensed.

The communication unit 52 transmits the sleeping states of the first and second users sensed by the human state sensing unit 51 to the communications terminal 100.

The communication unit 7 of the communications terminal 100 receives the sleeping states of the first and second users transmitted from the human presence sensing device 500.

When a motion of the communications terminal 100 is sensed, the illumination control unit 6 judges whether or not the second user who is in the same space as the first user who owns the communications terminal 100 is sleeping. At this time, the illumination control unit 6 judges whether or not the second user is sleeping in accordance with the sleeping states of the individual users received by the communication unit 7.

In a case where it is judged that the second user is sleeping, the illumination control unit 6 transmits a control signal based on the second illumination setting information to only the first illumination device 200a. In a case where it is judged that the second user is not sleeping, the illumination control unit 6 transmits a control signal based on the second illumination setting information to the first illumination device 200a and the second illumination device 200b.

The illumination device to which a control signal for illumination is to be transmitted in a case where it is judged that the second user is sleeping may be set by the user in advance.

The seventh embodiment is the same as the first embodiment except that a control signal based on the second illumination setting information is transmitted to the first illumination device 200a in a case where it is judged that the second user is sleeping, and thus any more detailed description is omitted.

Eighth Embodiment

Figure 12:
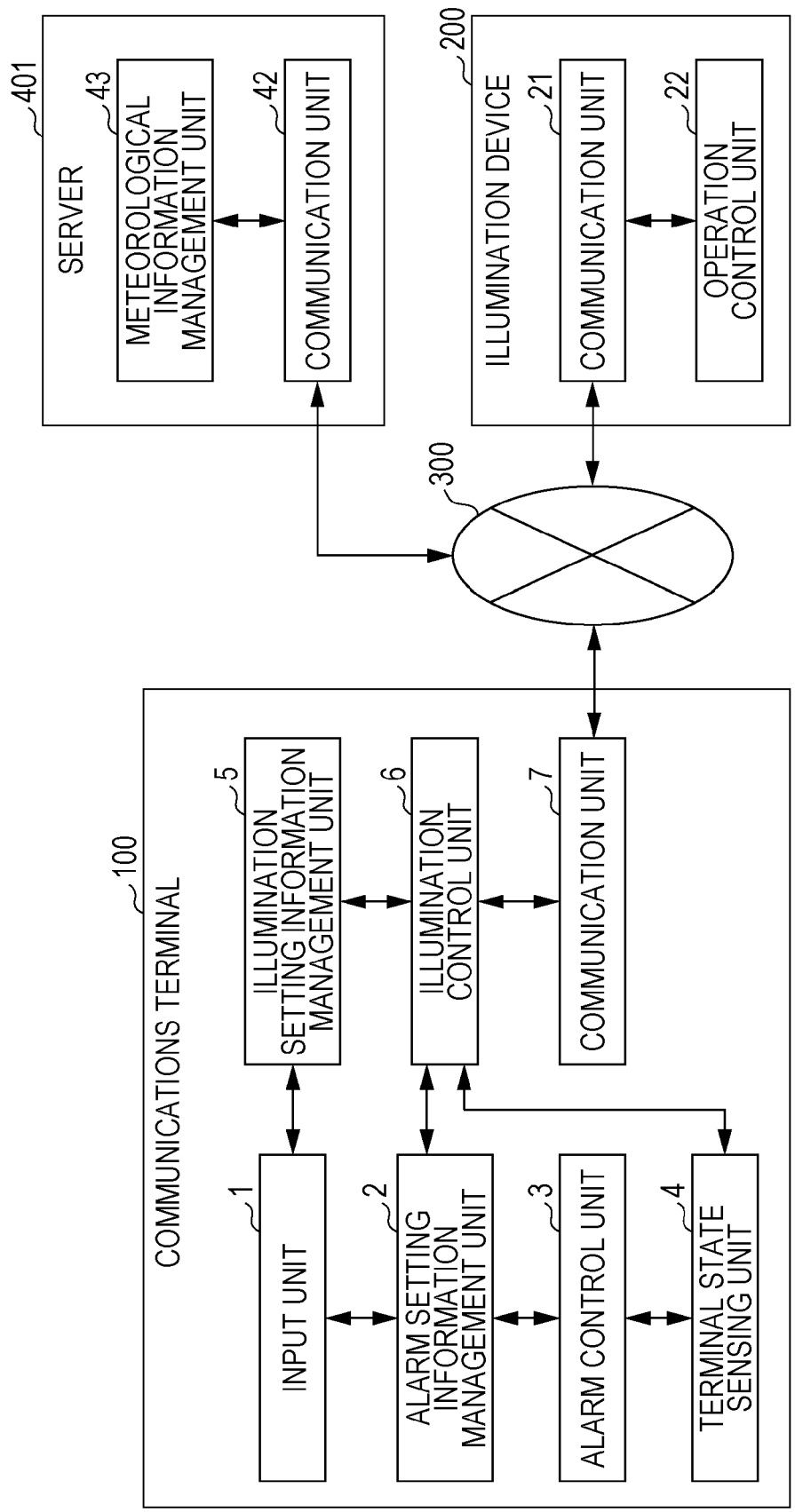
FIG. 12 is a diagram illustrating the configuration of an illumination control system according to an eighth embodiment of the present disclosure.

FIG. 12 is a diagram illustrating the configuration of an illumination control system according to an eighth embodiment of the present disclosure. The illumination control system illustrated in FIG. 12 includes the communications terminal 100, the illumination device 200, and a server 401. In the illumination control system according to the eighth embodiment, the same parts as those in the illumination control systems according to the first to seventh embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, and the communication unit 7. The illumination device 200 includes the communication unit 21 and the operation control unit 22. The server 401 is connected to the communications terminal 100 via the network 300 so as to be capable of communicating with the communications terminal 100. The server 401 includes a meteorological information management unit 43 and the communication unit 42.

The meteorological information management unit 43 manages meteorological information. The meteorological information includes, for example, weather forecast, probability of precipitation, minimum temperature, maximum temperature, airborne pollen level, amount of ultraviolet rays, and so forth.

The communication unit 42 transmits the meteorological information managed by the meteorological information management unit 43 to the communications terminal 100.

The communication unit 7 of the communications terminal 100 receives the meteorological information transmitted from the server 401.

The illumination control unit 6 determines a setting value of at least one of the illuminance, wavelength, and lighting pattern included in the second illumination setting information, on the basis of the meteorological information received by the communication unit 7. For example, if the weather forecast for the day when the user wakes up is sunny, the illumination control unit 6 generates second illumination setting information including a certain illuminance and a wavelength corresponding to red, and stores the second illumination setting information in the illumination setting information management unit 5. For example, if the weather forecast for the day when the user wakes up is rainy, the illumination control unit 6 generates second illumination setting information including a certain illuminance and a wavelength corresponding to blue. In this way, the illumination control unit 6 determines a setting value of a certain illuminance and a setting value of a color (wavelength) corresponding to the weather forecast for the day when the user wakes up.

Alternatively, for example, the illumination control unit 6 may determine a setting value of a certain illuminance and a setting value of a color (wavelength) corresponding to the probability of precipitation of the day when the user wakes up, as the second illumination setting information. Alternatively, for example, the illumination control unit 6 may determine a setting value of a certain illuminance and a setting value of a color (wavelength) corresponding to the difference between the minimum temperature of the day when the user wakes up and the minimum temperature of the previous day, as the second illumination setting information. Alternatively, for example, the illumination control unit 6 may determine a setting value of a certain illuminance and a setting value of a color (wavelength) corresponding to the difference between the maximum temperature of the day when the user wakes up and the maximum temperature of the previous day, as the second illumination setting information. Alternatively, for example, the illumination control unit 6 may determine a setting value of a certain illuminance and a setting value of a color (wavelength) corresponding to the airborne pollen level of the day when the user wakes up, as the second illumination setting information. Alternatively, for example, the illumination control unit 6 may determine a setting value of a certain illuminance and a setting value of a color (wavelength) corresponding to the amount of ultraviolet rays of the day when the user wakes up, as the second illumination setting information.

In a case where the probability of precipitation of the day when the user wakes up is higher than or equal to a certain threshold (for example, 50%), the illumination control unit 6 may determine a setting value of a certain illuminance and a setting value of a lighting pattern in which a light source blinks at certain intervals, as the second illumination setting information.

Further, the communications terminal 100 may determine the range of a settable illuminance or wavelength in the second illumination setting information on the basis of an ambient temperature of the illumination device 200 measured by the communications terminal 100. For example, in a case where the ambient temperature is higher than a certain reference temperature, the range of a settable illuminance is limited to a range of a lower illuminance than usual, and the range of a settable wavelength is limited to a range of a wavelength of cold colors. In a case where the ambient temperature is lower than the certain reference temperature, the range of a settable illuminance is limited to a range of a higher illuminance than usual, and the range of a settable wavelength is limited to a range of a wavelength of warm colors. Here, it is assumed that the maximum illuminance of the illumination device 200 is 100%. In this case, the range of a normally settable illuminance is 0 to 100%, whereas the range of an illuminance limited to a lower range is 0 to 50%, and the range of an illuminance limited to a higher range is 50 to 100%, for example. Also, the range of a normally settable wavelength is 300 to 800 nm. On the other hand, the range of a wavelength limited to cold colors is a range of a wavelength corresponding to the colors ranging from 10 PB to 10 BG in the Munsell color system, and the range of a wavelength limited to warm colors is a range of a wavelength corresponding to the colors ranging from 5 RP to 5 GY in the Munsell color system, for example.

The correspondence between the meteorological information and the illuminance, wavelength, and lighting pattern of illumination may be set by the user in advance.

The eighth embodiment is the same as the first embodiment except that a setting value of at least one of the illuminance, wavelength, and lighting pattern included in the second illumination setting information is determined on the basis of meteorological information, and thus any more detailed description is omitted.

Ninth Embodiment

Figure 13:
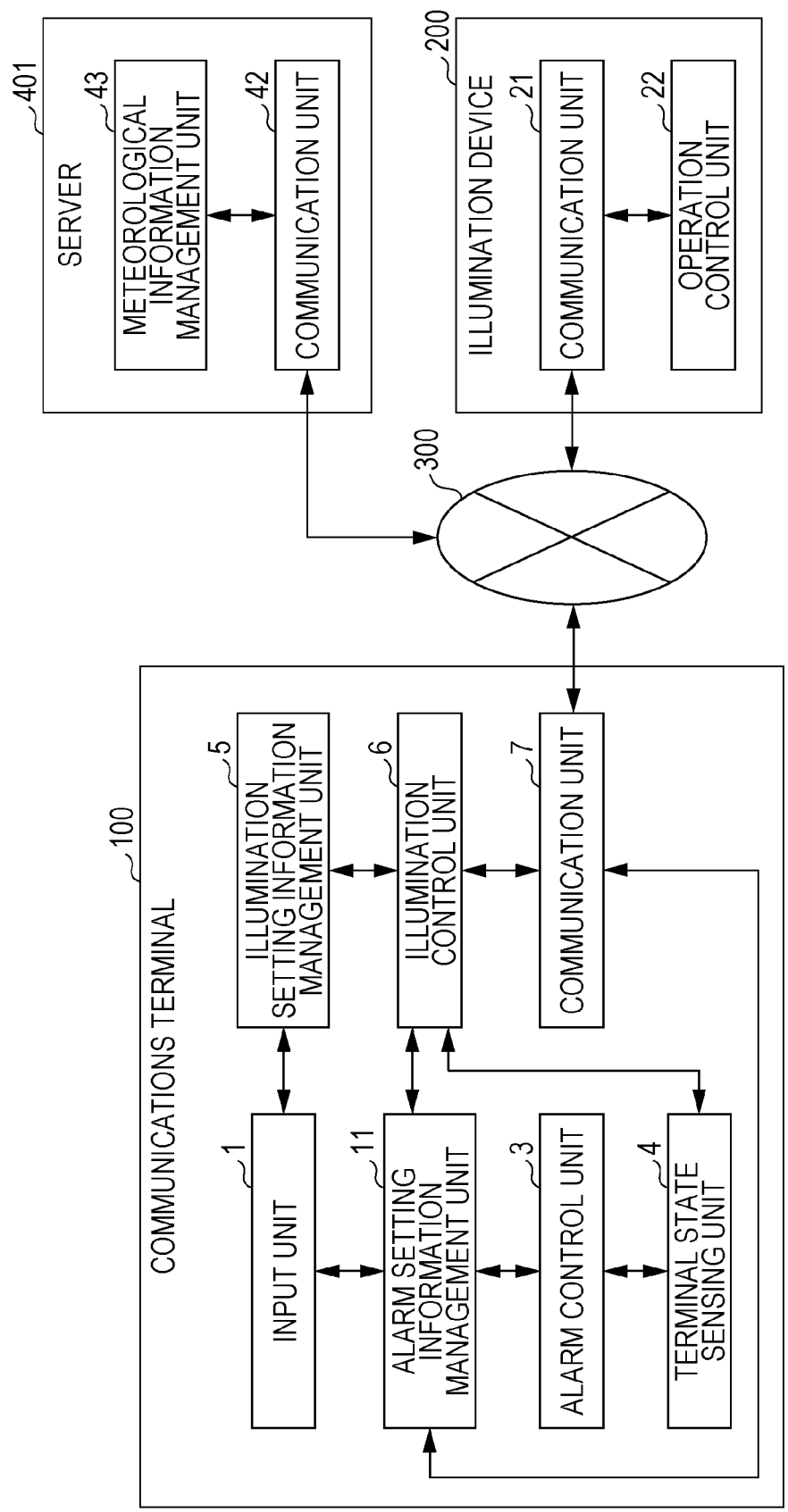
FIG. 13 is a diagram illustrating the configuration of an illumination control system according to a ninth embodiment of the present disclosure.

FIG. 13 is a diagram illustrating the configuration of an illumination control system according to a ninth embodiment of the present disclosure. The illumination control system illustrated in FIG. 13 includes the communications terminal 100, the illumination device 200, and the server 401. In the illumination control system according to the ninth embodiment, the same parts as those in the illumination control systems according to the first to eighth embodiments are denoted by the same reference numerals, and the description thereof is omitted.

The communications terminal 100 includes the input unit 1, an alarm setting information management unit 11, the alarm control unit 3, the terminal state sensing unit 4, the illumination setting information management unit 5, the illumination control unit 6, and the communication unit 7. The illumination device 200 includes the communication unit 21 and the operation control unit 22. The server 401 includes the meteorological information management unit 43 and the communication unit 42.

The alarm setting information management unit 11 determines alarm setting information on the basis of meteorological information received by the communication unit 7. For example, if the weather forecast for the day when the user wakes up is rainy, the alarm setting information management unit 11 moves the time represented by the currently held alarm setting information a certain period ahead. For example, in a case where the time represented by the currently held alarm setting information is 7 o'clock and where the weather forecast for the day when the user wakes up is rainy, the alarm setting information management unit 11 changes the time represented by the alarm setting information to 6 o'clock, which is one hour earlier, and holds the alarm setting information.

Accordingly, for example, in a case where the commuting time on a rainy day is longer than that on a sunny day, even if it is rain on the day when the user wakes up, the user can wake up earlier than the wake-up time that is set by the user in advance.

The time represented by the alarm setting information may be moved ahead a predetermined certain period or a certain period set by the user. The certain period is stored in association with meteorological information (for example, weather forecast).

The ninth embodiment is the same as the first embodiment except that alarm setting information is determined on the basis of meteorological information, and thus any more detailed description is omitted.

Tenth Embodiment

Figure 14:
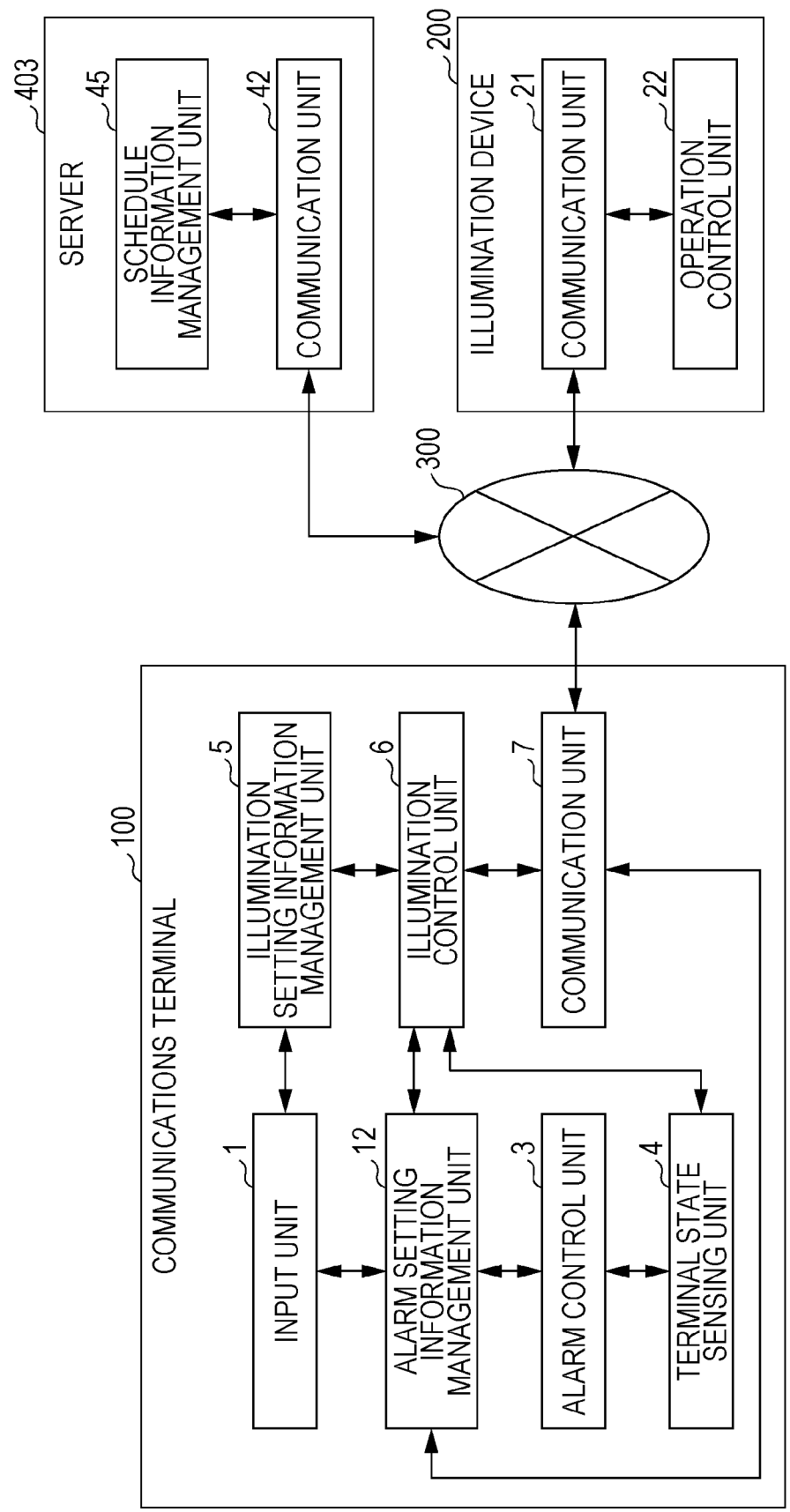
FIG. 14 is a diagram illustrating the configuration of an illumination control system according to a tenth embodiment of the present disclosure.

FIG. 14 is a diagram illustrating the configuration of an illumination control system according to a tenth embodiment of the present disclosure. The illumination control system illustrated in FIG. 14 includes the communications terminal 100, the illumination device 200, and a server 403. In the illumination control system according to the tenth embodiment, the same parts as those in the illumination control systems according to the first to ninth embodiments are denoted by the same reference numerals, and the description thereof is omitted.

The communications terminal 100 includes the input unit 1, an alarm setting information management unit 12, the alarm control unit 3, the terminal state sensing unit 4, the illumination setting information management unit 5, the illumination control unit 6, and the communication unit 7. The illumination device 200 includes the communication unit 21 and the operation control unit 22. The server 403 is connected to the communications terminal 100 via the network 300 so as to be capable of communicating with the communications terminal 100. The server 403 includes a schedule information management unit 45 and the communication unit 42.

The schedule information management unit 45 manages schedule information representing a schedule of the user. For example, the input unit 1 of the communications terminal 100 accepts input of a schedule from the user. The input schedule information is transmitted to the server 403 and is stored in the schedule information management unit 45.

The communication unit 42 transmits the schedule information managed by the schedule information management unit 45 to the communications terminal 100. The schedule information includes a schedule start time representing the time at which the first event in the schedule of one day is performed.

The communication unit 7 of the communications terminal 100 receives the schedule information transmitted from the server 403.

The alarm setting information management unit 12 determines alarm setting information on the basis of the schedule information received by the communication unit 7. The alarm setting information management unit 12 holds, as alarm setting information, a time a certain period before the schedule start time included in the schedule information. For example, in a case where the schedule start time is 9 o'clock, the alarm setting information management unit 12 holds, as alarm setting information, 7 o'clock which is two hours before 9 o'clock, which is the schedule start time.

Accordingly, alarm setting information is automatically set without inputting alarm setting information, and thus a user operation can be simplified.

As alarm setting information, a time a predetermined certain period before the schedule start time may be set, or a time a certain period set by the user before the schedule start time may be set.

The tenth embodiment is the same as the first embodiment except that alarm setting information is determined on the basis of schedule information, and thus any more detailed description is omitted.

Eleventh Embodiment

Figure 15:
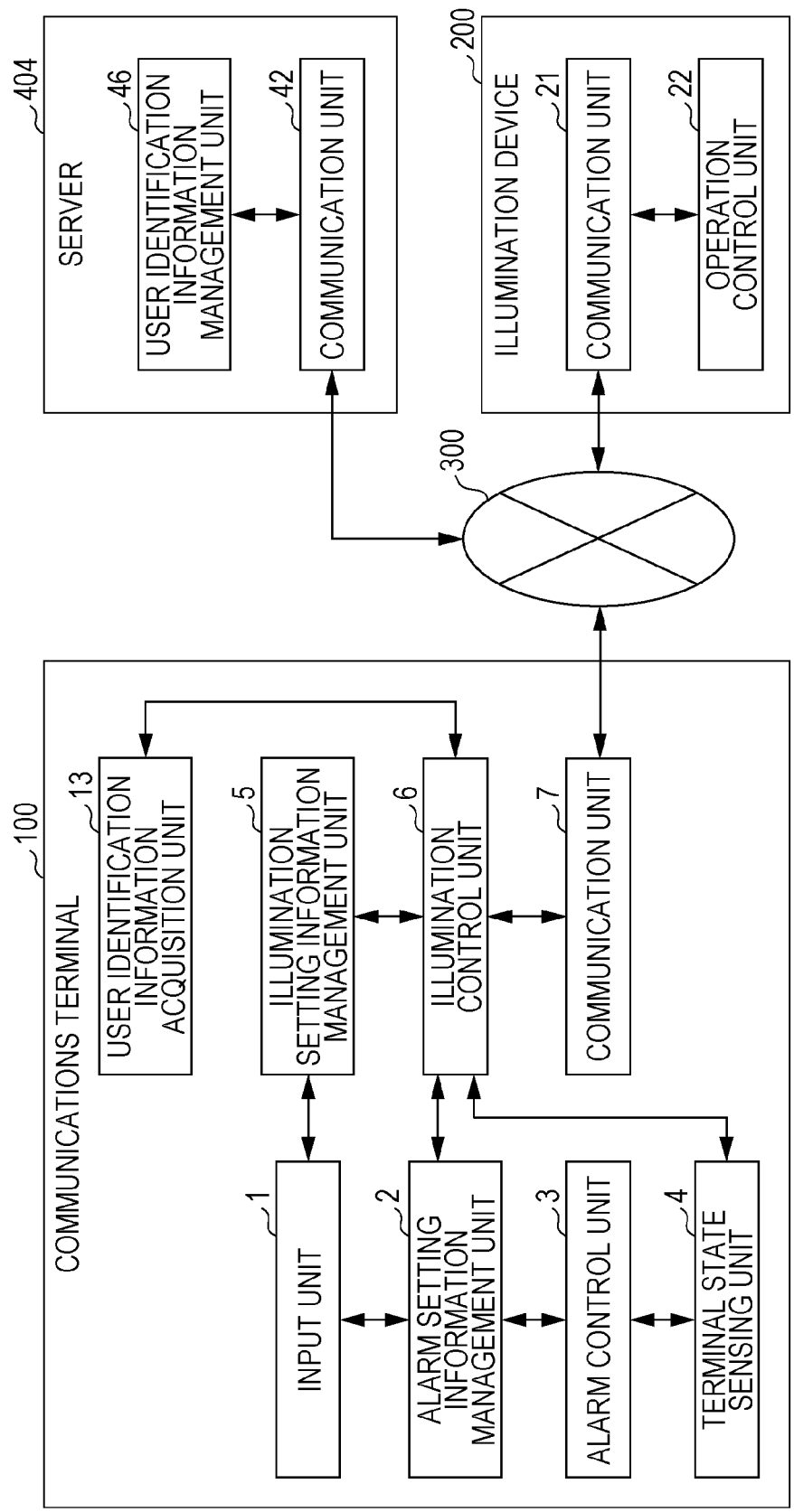
FIG. 15 is a diagram illustrating the configuration of an illumination control system according to an eleventh embodiment of the present disclosure.

FIG. 15 is a diagram illustrating the configuration of an illumination control system according to an eleventh embodiment of the present disclosure. The illumination control system illustrated in FIG. 15 includes the communications terminal 100, the illumination device 200, and a server 404. In the illumination control system according to the eleventh embodiment, the same parts as those in the illumination control systems according to the first to tenth embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, the communication unit 7, and a user identification information acquisition unit 13. The illumination device 200 includes the communication unit 21 and the operation control unit 22. The server 404 is connected to the communications terminal 100 via the network 300 so as to be capable of communicating with the communications terminal 100. The server 404 includes a user identification information management unit 46 and the communication unit 42.

The user identification information management unit 46 manages user identification information for identifying the user. An example of user identification information is biological information such as fingerprint information or voice information. The user identification information management unit 46 stores user identification information together with a user ID. Alternatively, the user identification information may be character information such as a password.

The communication unit 42 receives user identification information from the communications terminal 100, acquires a user ID corresponding to the received user identification information from the user identification information management unit 46, and transmits the user ID to the communications terminal 100.

The user identification information acquisition unit 13 of the communications terminal 100 acquires user identification information for identifying one of a plurality of users. In a case where the user identification information is character information, the user identification information acquisition unit 13 accepts input of the character information from the user, and acquires the character information input by the user. In a case where the user identification information is fingerprint information, the user identification information acquisition unit 13 reads a fingerprint of the user, and acquires the read fingerprint information. In a case where the user identification information is voice information, the user identification information acquisition unit 13 acquires voice of the user, and converts the acquired analog voice to digital voice information.

The illumination setting information management unit 5 manages second illumination setting information for each user. The second illumination setting information includes a plurality of pieces of second illumination setting information for a plurality of users. The illumination setting information management unit 5 stores a user ID and second illumination setting information in association with each other.

The communication unit 7 transmits the user identification information acquired by the user identification information acquisition unit 13 to the server 404, and receives a user ID transmitted from the server 404.

The illumination control unit 6 determines, on the basis of the acquired user identification information, a piece of second illumination setting information for one user among a plurality of pieces of second illumination setting information. That is, the illumination control unit 6 transmits the user identification information acquired by the user identification information acquisition unit 13 to the server 404, and reads out a piece of second illumination setting information corresponding to the user ID received by the communication unit 7 from the illumination setting information management unit 5. Also, the illumination control unit 6 transmits a control signal based on the piece of second illumination setting information to the illumination device 200.

In the case of registering user identification information in the server 404, the input unit 1 of the communications terminal 100 accepts input of a user ID from the user, and the user identification information acquisition unit 13 acquires user identification information. The user ID and the user identification information are transmitted to the server 404, and are stored in the user identification information management unit 46 in association with each other.

The eleventh embodiment is the same as the first embodiment except that a piece of second illumination setting information for one user is determined among a plurality of pieces of second illumination setting information on the basis of acquired user identification information, and thus any more detailed description is omitted.

Twelfth Embodiment

Figure 16:
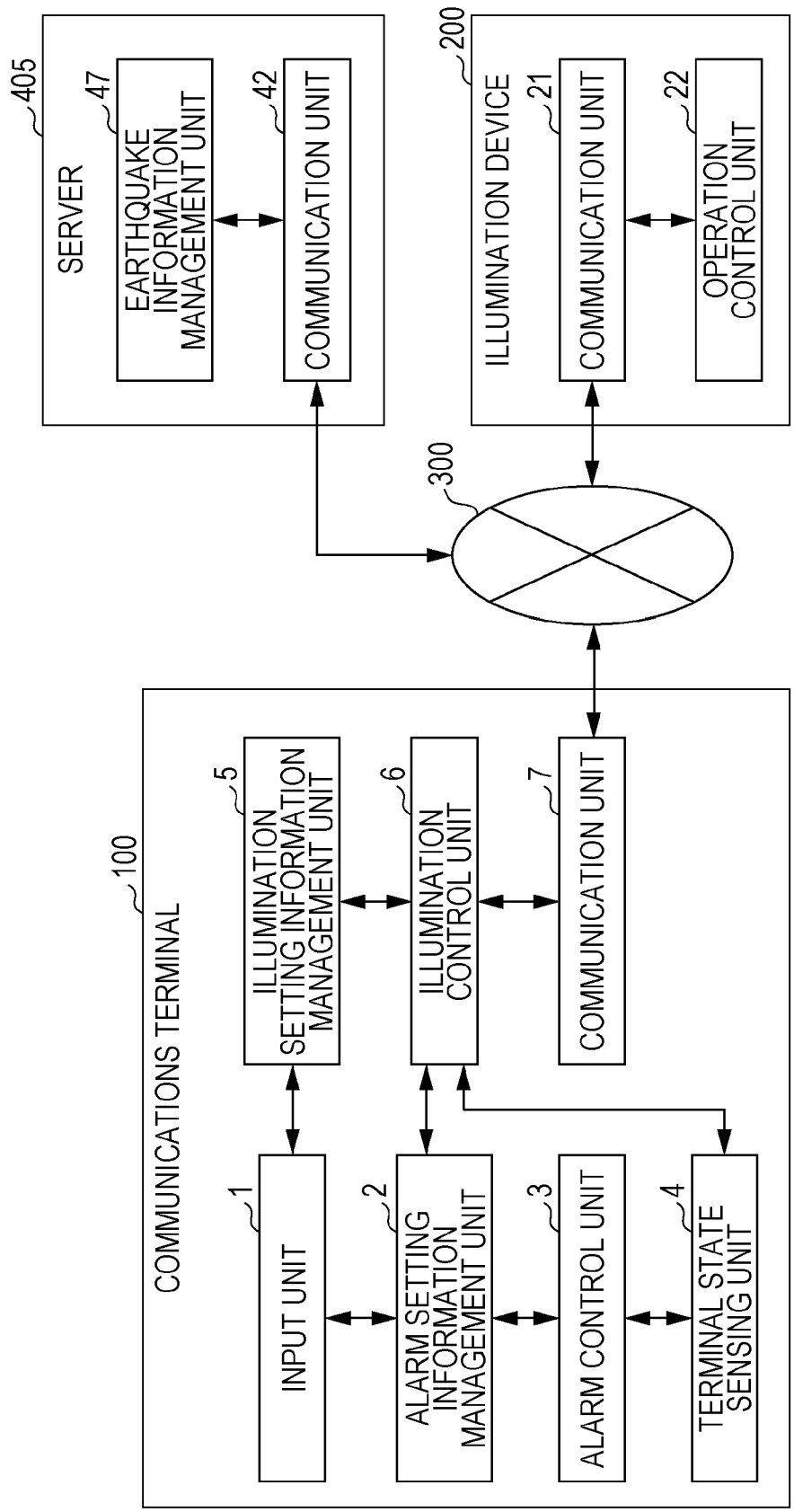
FIG. 16 is a diagram illustrating the configuration of an illumination control system according to a twelfth embodiment of the present disclosure.

FIG. 16 is a diagram illustrating the configuration of an illumination control system according to a twelfth embodiment of the present disclosure. The illumination control system illustrated in FIG. 16 includes the communications terminal 100, the illumination device 200, and a server 405. In the illumination control system according to the twelfth embodiment, the same parts as those in the illumination control systems according to the first to eleventh embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, and the communication unit 7. The illumination device 200 includes the communication unit 21 and the operation control unit 22. The server 405 is connected to the communications terminal 100 via the network 300 so as to be capable of communicating with the communications terminal 100. The server 405 includes an earthquake information management unit 47 and the communication unit 42.

The earthquake information management unit 47 manages earthquake information indicating that an earthquake has occurred. The earthquake information is, for example, an earthquake bulletin provided by a meteorological agency or a weather forecast company.

The communication unit 42 transmits the earthquake information managed by the earthquake information management unit 47 to the communications terminal 100.

The communication unit 7 of the communications terminal 100 receives the earthquake information transmitted from the server 405.

When sensing a motion of the communications terminal 100, the illumination control unit 6 judges, on the basis of the received earthquake information, whether or not the motion of the communications terminal 100 is due to the user or the earthquake. In a case where it is judged that the motion of the communications terminal 100 is due to the earthquake, the illumination control unit 6 changes a setting value of at least one of the illuminance, wavelength, and lighting pattern included in the second illumination setting information to a specific setting value indicating that an earthquake has occurred. The illumination control unit 6 then transmits a control signal based on the second illumination setting information to the illumination device 200.

The specific setting value is a setting value of at least one of an illuminance, a wavelength, and a lighting pattern for notifying the user that an earthquake has occurred. For example, the specific setting value may be an illuminance or wavelength for awakening the user, or may be a lighting pattern for blinking a light source.

In addition to the first illumination setting information and the second illumination setting information, the illumination setting information management unit 5 further holds earthquake illumination setting information (third illumination setting information) for setting an illumination state of the illumination device 200 in a space after an earthquake has occurred. The earthquake illumination setting information includes a setting value of at least one of the illumination, wavelength, and lighting pattern of the illumination device 200 after the occurrence of an earthquake. The earthquake illumination setting information represents a setting value of the illumination device 200 when the user wakes up after an earthquake has occurred. For example, the earthquake illumination setting information may be an illuminance value for brightly illuminating a space to help the user evacuate, or may be a maximum illuminance value settable in the illumination device 200.

The illuminance, wavelength, and lighting pattern of illumination for the time of the occurrence of an earthquake or after the occurrence of an earthquake may be set by the user in advance.

After it is judged that the motion of the communications terminal 100 is due to an earthquake, if a motion of the communications terminal 100 is sensed, the illumination control unit 6 transmits a control signal based on the third illumination setting information to the illumination device 200.

A trigger of changing a setting value of at least one of the illuminance, wavelength, and lighting pattern included in the second illumination setting information to a specific setting value is not limited to the occurrence of an earthquake. The communications terminal 100 may receive communication information, and a setting value of at least one of the illuminance, wavelength, and lighting pattern included in the second illumination setting information can be changed to a specific setting value on the basis of the received communication information. For example, in a case where the number of messages or comments received via a social networking service (SNS) application is larger than or equal to a certain number or where a message or comment transmitted from a specific person is received, the setting value may be changed to a specific setting value representing that fact.

The twelfth embodiment is the same as the first embodiment except that, in a case where it is judged that a motion of the communications terminal 100 is due to an earthquake, a setting value of at least one of the illuminance, wavelength, and lighting pattern included in the second illumination setting information is changed to a specific setting value indicating that an earthquake has occurred, and a control signal based on the second illumination setting information is transmitted to the illumination device 200, and in a case where a motion of the communications terminal 100 is sensed after it is judged that a motion of the communications terminal 100 is due to an earthquake, a control signal based on earthquake illumination setting information is transmitted to the illumination device 200. Thus, any more detailed description is omitted.

Thirteenth Embodiment

Figure 17:
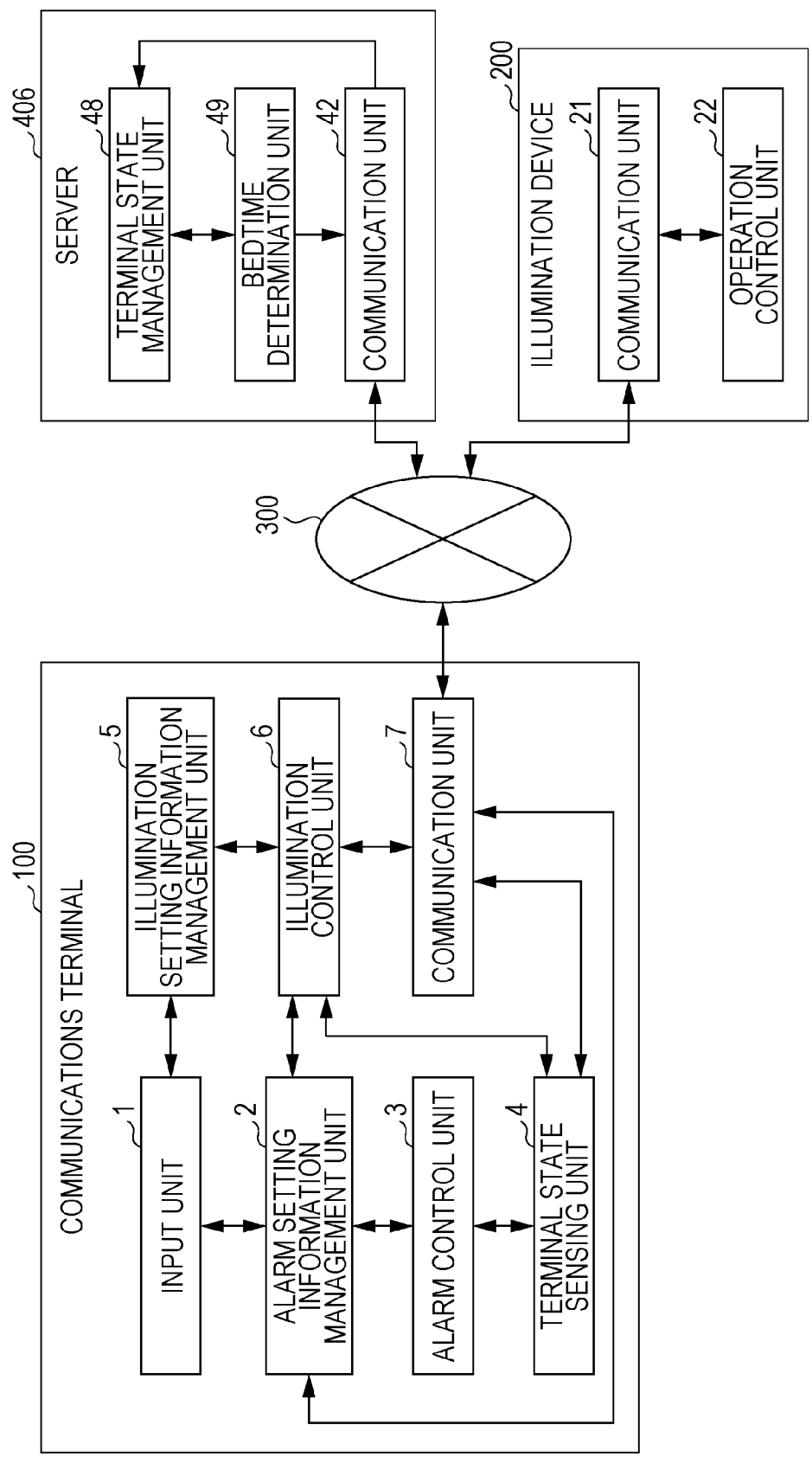
FIG. 17 is a diagram illustrating the configuration of an illumination control system according to a thirteenth embodiment of the present disclosure.

FIG. 17 is a diagram illustrating the configuration of an illumination control system according to a thirteenth embodiment of the present disclosure. The illumination control system illustrated in FIG. 17 includes the communications terminal 100, the illumination device 200, and a server 406. In the illumination control system according to the thirteenth embodiment, the same parts as those in the illumination control systems according to the first to twelfth embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, and the communication unit 7. The illumination device 200 includes the communication unit 21 and the operation control unit 22. The server 406 is connected to the communications terminal 100 via the network 300 so as to be capable of communicating with the communications terminal 100. The server 406 includes a terminal state management unit 48, a bedtime determination unit 49, and the communication unit 42.

The terminal state management unit 48 holds and manages log information representing a history of times at which a motion of the communications terminal 100 was sensed.

The bedtime determination unit 49 determines a user's recommended bedtime on the basis of the log information managed by the terminal state management unit 48. The bedtime determination unit 49 calculates an average time in a certain period of the times at which a motion of the communications terminal 100 was sensed included in the log information, subtracts a certain hour from the calculated average time, and determines the result as a recommended bedtime.

The certain period is a predetermined period, for example, one month from June to July of 2013, or 43 days as a total of Monday to Friday of June to July of 2013. The certain period may be set by the user in advance. The certain hour is a predetermined hour, for example, 7 hours. The certain hour may be set by the user in advance.

The communication unit 42 receives, from the communications terminal 100, a time at which a motion of the communications terminal 100 was sensed, and outputs the received time at which a motion of the communications terminal 100 was sensed to the terminal state management unit 48. Also, the communication unit 42 transmits a recommended bedtime determined by the bedtime determination unit 49 to the communications terminal 100.

The communication unit 7 of the communications terminal 100 receives the recommended bedtime transmitted from the server 406. The communication unit 7 outputs the received recommended bedtime to the alarm setting information management unit 2.

The alarm setting information management unit 2 holds and manages the recommended bedtime received by the communication unit 7.

The illumination setting information management unit 5 holds and manages sleeping illumination setting information (fourth illumination setting information) for setting an illumination state of the illumination device 200 in a space when the user goes to bed. The sleeping illumination setting information includes a setting value of at least one of the illuminance, wavelength, and lighting pattern of the illumination device 200.

When the current time becomes the recommended bedtime, the illumination control unit 6 transmits a control signal based on the sleeping illumination setting information to the illumination device 200. The control signal based on the sleeping illumination setting information is a control signal for gradually changing (for example, decreasing) the illuminance of the illumination device 200, or a control signal for gradually changing the wavelength of the illumination device 200. The illumination control unit 6 gradually changes (for example, decreases) the illuminance from the recommended bedtime to an illumination end time. At this time, the illuminance at the recommended bedtime is an illuminance that does not prevent the user from falling asleep, for example, 500 lux or less.

Also, the illumination control unit 6 gradually changes the wavelength from the recommended bedtime to the illumination end time. At this time, the wavelength at the recommended bedtime is a wavelength that does not prevent the user from falling asleep, that is, a wavelength having weak light stimulation.

The illuminance, wavelength, and lighting pattern of illumination at the recommended bedtime may be set by the user in advance.

A setting value of at least one of the illuminance, wavelength, and lighting pattern included in the fourth illumination setting information may be set on the basis of the communication information received by the communications terminal 100. For example, in a case where the number of messages or comments received by the communications terminal 1 via an SNS application is larger than or equal to a certain number or where a message or comment transmitted from a specific person is received by the communications terminal 1, the setting value may be set to a specific setting value representing that fact.

In the thirteenth embodiment, the bedtime determination unit 49 is provided in the server 406, but the present disclosure is not limited thereto. Alternatively, the communications terminal 100 may include the bedtime determination unit 49.

The thirteenth embodiment is the same as the first embodiment except that a control signal based on sleeping illumination setting information is transmitted to the illumination device 200 when the current time becomes the recommended sleeping time, and thus any more detailed description is omitted.

Fourteenth Embodiment

Figure 18:
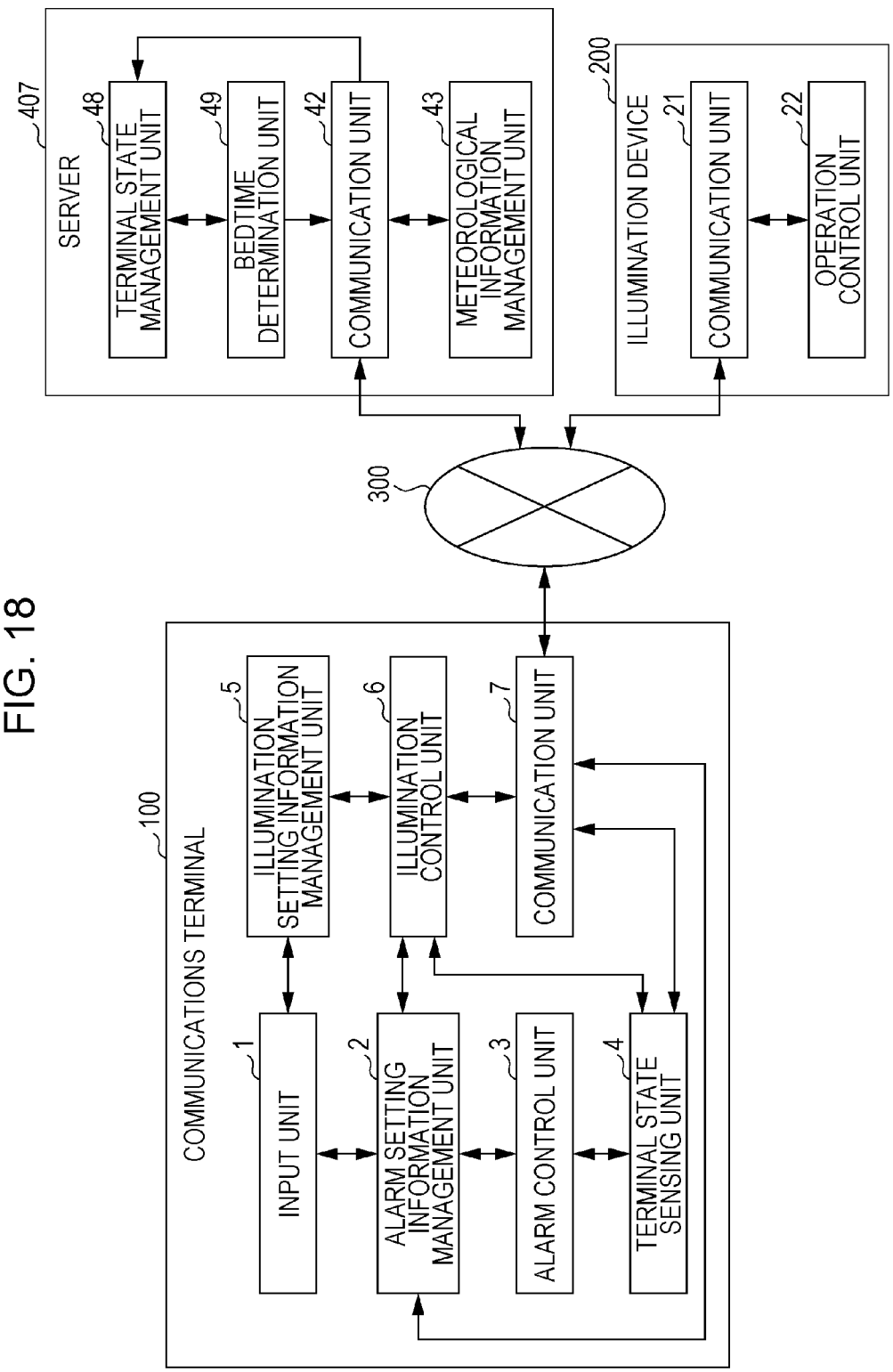
FIG. 18 is a diagram illustrating the configuration of an illumination control system according to a fourteenth embodiment of the present disclosure.

FIG. 18 is a diagram illustrating the configuration of an illumination control system according to a fourteenth embodiment of the present disclosure. The illumination control system illustrated in FIG. 18 includes the communications terminal 100, the illumination device 200, and a server 407. In the illumination control system according to the fourteenth embodiment, the same parts as those in the illumination control systems according to the first to thirteenth embodiments are denoted by the same reference numerals, and the description thereof is omitted.

The communications terminal 100 includes the input unit 1, the alarm setting information management unit 2, the alarm control unit 3, the terminal state sensing unit 4, the illumination setting information management unit 5, the illumination control unit 6, and the communication unit 7. The illumination device 200 includes the communication unit 21 and the operation control unit 22. The server 407 is connected to the communications terminal 100 via the network 300 so as to be capable of communicating with the communications terminal 100. The server 407 includes the meteorological information management unit 43, the terminal state management unit 48, the bedtime determination unit 49, and the communication unit 42.

The meteorological information management unit 43 manages meteorological information. The meteorological information includes, for example, weather forecast, probability of precipitation, minimum temperature, maximum temperature, airborne pollen level, amount of ultraviolet rays, and so forth.

The terminal state management unit 48 holds and manages log information representing a history of times at which a motion of the communications terminal 100 was sensed.

The bedtime determination unit 49 determines a user's recommended bedtime on the basis of the log information managed by the terminal state management unit 48.

The communication unit 42 transmits the meteorological information managed by the meteorological information management unit 43 to the communications terminal 100. Also, the communication unit 42 receives, from the communications terminal 100, a time at which a motion of the communications terminal 100 was sensed, and outputs the received time at which a motion of the communications terminal 100 was sensed to the terminal state management unit 48. Also, the communication unit 42 transmits a recommended bedtime determined by the bedtime determination unit 49 to the communications terminal 100.

The communication unit 7 of the communications terminal 100 receives the meteorological information transmitted from the server 407. Also, the communication unit 7 receives the recommended bedtime transmitted from the server 407.

The alarm setting information management unit 2 holds and manages the recommended bedtime received by the communication unit 7.

The illumination setting information management unit 5 holds and manages sleeping illumination setting information (fourth illumination setting information) for setting an illumination state of the illumination device 200 in a space when the user goes to bed. The sleeping illumination setting information includes a setting value of at least one of the illuminance, wavelength, and lighting pattern of the illumination device 200.

The illumination control unit 6 determines a setting value of at least one of the illuminance, wavelength, and lighting pattern included in the sleeping illumination setting information, on the basis of the meteorological information received by the communication unit 7. For example, in a case where the weather forecast for the day after the day when the user goes to bed is sunny, the illumination control unit 6 generates sleeping illumination setting information including a certain illuminance and a wavelength corresponding to red, and stores the sleeping illumination setting information in the illumination setting information management unit 5. In a case where the weather forecast for the day after the day when the user goes to bed is rainy, the illumination control unit 6 generates sleeping illumination setting information including a certain illuminance and a wavelength corresponding to blue. In this way, the illumination control unit 6 determines a setting value of a certain illuminance and a setting value of a color (wavelength) corresponding to the weather forecast for the day after the day when the user goes to bed.

Alternatively, for example, the illumination control unit 6 may determine a setting value of a certain illuminance and a setting value of a color (wavelength) corresponding to the probability of precipitation of the day after the day when the user goes to bed, as sleeping illumination setting information. Alternatively, for example, the illumination control unit 6 may determine a setting value of a certain illuminance and a setting value of a color (wavelength) corresponding to the difference between the minimum temperature of the day after the day when the user goes to bed and the minimum temperature of the day when the user goes to bed, as sleeping illumination setting information. Alternatively, for example, the illumination control unit 6 may determine a setting value of a certain illuminance and a setting value of a color (wavelength) corresponding to the difference between the maximum temperature of the day after the day when the user goes to bed and the maximum temperature of the day when the user goes to bed, as sleeping illumination setting information. Alternatively, for example, the illumination control unit 6 may determine a setting value of a certain illuminance and a setting value of a color (wavelength) corresponding to the airborne pollen level of the day after the day when the user goes to bed, as sleeping illumination setting information. Alternatively, for example, the illumination control unit 6 may determine a setting value of a certain illuminance and a setting value of a color (wavelength) corresponding to the amount of ultraviolet rays of the day after the day when the user goes to bed, as sleeping illumination setting information.

Further, for example, in a case where the probability of precipitation of the day after the day when the user goes to bed is higher than or equal to a certain threshold (for example, 50%), the illumination control unit 6 may determine a setting value of a certain illuminance and a setting value of a lighting pattern in which a light source blinks at certain intervals, as sleeping illumination setting information.

The correspondence between the meteorological information and the illuminance, wavelength, and lighting pattern of illumination may be set by the user in advance.

The fourteenth embodiment is the same as the first embodiment except that a setting value of at least one of the illuminance, wavelength, and lighting pattern included in sleeping illumination setting information is determined on the basis of meteorological information, and thus any more detailed description is omitted.

The above-described specific embodiments mainly include an invention having the following aspects.

An aspect of the present disclosure is a method for controlling a communications terminal that controls an illumination device via a network. The communications terminal includes a computer, a memory, and a sensor that senses a motion of the communications terminal. The method includes causing the computer of the communications terminal to store first illumination setting information and second illumination setting information in the memory, the first illumination setting information being used to set the illumination device to a first illumination state, the second illumination setting information being used to set the illumination device to a second illumination state different from the first illumination state; causing the computer of the communications terminal to, at a certain illumination start time at which the illumination device is to be turned on, transmit a first control signal corresponding to the first illumination setting information to the illumination device via the network the illumination device is set to the first illumination state; and causing the computer of the communications terminal to, in a case where the sensor senses a motion of the communications terminal after the certain illumination start time has passed, transmit a second control signal corresponding to the second illumination setting information to the illumination device via the network such that the illumination device is set to the second illumination state.

According to this aspect, the illumination device is brought into the first illumination state at the illumination start time of the illumination device. For example, before an expected time at which a user wakes up in the morning, the illumination device lights up dimly. When it is judged that the user has started moving, in accordance with a motion of the communications terminal, for example, the user has picked up the communications terminal (for example, smart phone), the illumination device is brought into the second illumination state (for example, normal brightness). Therefore, the awakening of the user can be easily detected, and not only the illumination state before the user wakes up but also the illumination state after the user wakes up can be controlled appropriately and easily.

Also, in the above-described aspect, the method may further include causing the computer of the communications terminal to, in a case where the sensor senses a motion of the communications terminal before the certain illumination start time has passed, transmit the second control signal to the illumination device via the network.

In this case, for example, the illumination device can be lit up in the second illumination state even in a case where the user wakes up at midnight.

Also, in the above-described aspect, for example, the second control signal that is transmitted in a case where the sensor senses a motion of the communications terminal after the certain illumination start time has passed may be identical to the second control signal that is transmitted in a case where the sensor senses a motion of the communications terminal before the certain illumination start time has passed.

In this case, for example, the illumination device can be lit up, in a case where the user wakes up at midnight, in a state identical to that in a case where the user has woken up.

Also, in the above-described aspect, for example, the second control signal that is transmitted in a case where the sensor senses a motion of the communications terminal after the certain illumination start time has passed may be different from the second control signal that is transmitted in a case where the sensor senses a motion of the communications terminal before the certain illumination start time has passed.

In this case, for example, the illumination device can be lit up, in a case where the user wakes up at midnight, in a state different from that in a case where the user has woken up.

Also, in the above-described aspect, for example, the first illumination setting information and the second illumination setting information may each represent an illuminance of light emitted by the illumination device, and a second illuminance represented by the second illumination state may be higher than a first illuminance represented by the first illumination state.

In this case, the illumination state of the illumination device can be appropriately set in accordance with the awakening of the user.

Also, in the above-described aspect, for example, the first illumination setting information and the second illumination setting information may each represent a color of light emitted by the illumination device, and a first color represented by the first illumination state may be different from a second color represented by the second illumination state.

In this case, the color of light of the illumination device before and after the awakening can be set in accordance with the personal preference of the user.

Also, in the above-described aspect, for example, the first illumination setting information and the second illumination setting information may each represent a lighting pattern of light emitted by the illumination device, and a first lighting pattern represented by the first illumination state may be different from a second lighting pattern represented by the second illumination state.

In this case, the lighting pattern of the illumination device before and after the awakening can be set in accordance with the personal preference of the user.

Also, in the above-described aspect, for example, the method may further include causing the computer of the communications terminal to store alarm setting information in the memory, the alarm setting information representing a time at which an alarm is to be output from the communications terminal, and causing the computer of the communications terminal to determine the illumination start time on the basis of the alarm setting information.

In this case, the alarm setting information representing a time at which an alarm is to be output is stored, and the illumination start time is determined on the basis of the alarm setting information, and thus the illumination start time is determined in accordance with a user's wake-up time.

Also, in the above-described aspect, for example, the method may further include causing the computer of the communications terminal to, in a case where a time at which the second control signal is transmitted to the illumination device is before the illumination start time, keep holding the alarm setting information in the memory; and causing the computer of the communications terminal to, in a case where a time at which the second control signal is transmitted to the illumination device is after the illumination start time, erase the alarm setting information from the memory.

In this case, in a case where a time at which the second control signal is transmitted to the illumination device is before the illumination start time, the alarm setting information is kept held. In a case where a time at which the second control signal is transmitted to the illumination device is after the illumination start time, the alarm setting information is erased.

Thus, even if a motion of the communications terminal is sensed before the illumination start time, the alarm setting information is kept held, and thus an alarm can be output at a user's wake-up time.

Also, in the above-described aspect, for example, the method may further include causing the computer of the communications terminal to, in a case where the communications terminal receives meteorological information, determine the alarm setting information on the basis of the received meteorological information.

In this case, the alarm setting information is determined on the basis of the meteorological information. Thus, for example, a wake-up time can be automatically moved ahead in accordance with the weather of the next day, and convenience can be increased.

Also, in the above-described aspect, for example, the method may further include causing the computer of the communications terminal to, in a case where the communications terminal receives schedule information representing a schedule of the user of the communications terminal, determine the alarm setting information on the basis of the received schedule information.

In this case, the schedule information representing a schedule of the user is received, and the alarm setting information is determined on the basis of the received schedule information. Thus, a wake-up time can be automatically determined in accordance the user's schedule of the next day, and convenience can be increased.

Also, in the above-described aspect, for example, the first control signal may be a control signal for gradually changing the illuminance of the illumination device, or a control signal for gradually changing the wavelength of the illumination device.

In this case, for example, the illuminance of the illumination device is gradually increased, or the wavelength of the illumination device is gradually changed, so that the user can wake up comfortably.

Also, in the above-described aspect, for example, the method may further include causing the computer of the communications terminal to, in a case where the communications terminal receives power usage information representing power usage in a certain area in which the illumination device is provided or electricity fee information representing electricity fees in individual certain time slots in the certain area, determine a range of the second illuminance settable in the communications terminal or a range of a wavelength corresponding to the second color and settable in the communications terminal, on the basis of the received power usage information or electricity fee information.

In this case, power usage information representing power usage or electricity fee information representing electricity fees in individual certain time slots is received. On the basis of the received power usage information or electricity fee information, the range of the second illuminance settable in the communications terminal or the range of the wavelength corresponding to the second color is determined.

Thus, the range of the second illuminance settable in the communications terminal or the range of the wavelength corresponding to the second color and settable in the communication terminal is determined on the basis of the power usage information or electricity fee information. Accordingly, for example, an increase in power consumption of the illumination device can be suppressed.

Also, in the above-described aspect, for example, the communications terminal may include a measurement unit that measures an illuminance of light emitted by the illumination device, and the method may further include causing the computer of the communications terminal to determine a range of the second illuminance settable in the communications terminal or a range of a wavelength corresponding to the second color and settable in the communications terminal, on the basis of the illuminance measured by the measurement unit.

In this case, the illuminance of light emitted from the illumination device is measured, and a range of the second illuminance settable in the communications terminal or a range of a wavelength corresponding to the second color and settable in the communications terminal is determined on the basis of the measured illuminance of light. Thus, for example, the illumination state of the illumination device can be set to an appropriate illuminance or wavelength corresponding to the illuminance of light emitted by the illumination device.

Also, in the above-described aspect, for example, the method may further include causing the computer of the communications terminal to accept, in the communications terminal, setting of an illumination mode of the illumination device from the user; and causing the computer of the communications terminal to determine a range of an illuminance settable in the communications terminal or a range of a wavelength settable in the communications terminal, on the basis of the accepted illumination mode.

In this case, setting of an illumination mode is accepted from the user, and a range of an illuminance settable in the communications terminal or a range of a wavelength settable in the communications terminal is determined on the basis of the accepted illumination mode. Thus, the illumination state of the illumination device can be set to an appropriate illuminance or wavelength corresponding to the illumination mode.

Also, in the above-described aspect, for example, the communications terminal may include a measurement unit that measures an illuminance of light emitted by the illumination device, and the method may further include causing the computer of the communications terminal to measure an illuminance of light emitted from the illumination device by using the measurement unit; causing the computer of the communications terminal to accept setting of an illumination mode of the illumination device from the user; and causing the computer of the communications terminal to determine an illuminance or wavelength included in the second illumination setting information on the basis of the accepted illumination mode.

In this case, an illuminance of light emitted from the illumination device is measured, and an illuminance or wavelength included in the second illumination setting information is determined on the basis of the measured ambient illuminance and the accepted illumination mode. Thus, the illumination state of the illumination device can be set to an appropriate illuminance or wavelength corresponding to the ambient illuminance and illumination mode of the illumination device.

Also, in the above-described aspect, for example, the communications terminal may be connected to a camera that is provided in a space where the communications terminal is placed. The method may further include causing the computer of the communications terminal to, in a case where the communications terminal senses a motion of the communications terminal, judge whether or not another user who is in the same space as the user is sleeping, on the basis of an image of the other user captured by the camera. The illuminance, wavelength, or lighting pattern included in the second illumination setting information in a case where it is judged that the other user is sleeping may be different from that in a case where it is judged that the other user is not sleeping.

In this case, in a case where a motion of the communications terminal is sensed, it is judged whether or not another user who is in the same space as the user is sleeping. The illuminance, wavelength, or lighting pattern included in the second illumination setting information in a case where it is judged that the other user is sleeping is different from that in a case where it is judged that the other user is not sleeping.

The illuminance, wavelength, or lighting pattern included in the second illumination setting information in a case where the other user is sleeping is different from that in a case where the other user is not sleeping. Thus, the illumination device can be controlled so as not to prevent the other user from sleeping.

Also, in the above-described aspect, for example, the communications terminal may be connected to a camera that is provided in a space where the communications terminal is placed. The method may further include causing the computer of the communications terminal to, in a case where the communications terminal senses a motion of the communications terminal, judge whether or not another user who is in the same space as the user is sleeping, on the basis of an image of the other user captured by the camera; and causing the computer of the communications terminal to, in a case where it is judged that the other user is sleeping, transmit a control signal that causes the illumination device to light up for a certain period and to be turned off after the certain period, as the second control signal.

In this case, in a case where a motion of the communications terminal is sensed, it is judged whether or not another user who is in the same space as the user is sleeping. In a case where it is judged that the other user is sleeping, a control signal that causes the illumination device to light up for a certain period and to be turned off after the certain period is transmitted as a control signal based on the second illumination setting information.

In a case where the other user is sleeping, the illumination device is lit up for the certain period and is turned off after the certain period has elapsed, and thus the illumination device can be controlled so as not to prevent the other user from sleeping.

Also, in the above-described aspect, for example, the communications terminal may be connected to a camera that is provided in a space where the communications terminal is placed. Further, a first illumination device that illuminates a first region in a space and a second illumination device that illuminates a second region in the space may be provided. The method may further include causing the computer of the communications terminal to, in a case where the communications terminal senses a motion of the communications terminal, judge whether or not another user who is in the same space as the user is sleeping, on the basis of an image of the other user captured by the camera; and causing the computer of the communications terminal to, in a case where it is judged that the other user is sleeping, transmit the second control signal to the first illumination device.

In this case, in a case where a motion of the communications terminal is sensed, it is judged whether or not another user who is in the same space as the user is sleeping. The illuminance, wavelength, or lighting pattern included in the second illumination setting information in a case where it is judged that the other user is sleeping is different from that in a case where it is judged that the other user is not sleeping.

Accordingly, for example, in a case where a user exists in the first region and another user exists in the second region, the illuminance, wavelength, or lighting pattern included in the second illumination setting information in a case where the other user is sleeping is different from that in a case where the other user is not sleeping. With the second illumination setting information, control can be performed so that only the first illumination device in the first region for illuminating the user is controlled and that the second illumination device in the second region for illuminating the other user is not controlled. Accordingly, the illumination device can be controlled so as not to prevent the other user from sleeping.

Also, in the above-described aspect, for example, the method may further include causing the computer of the communications terminal to, in a case where the communications terminal receives meteorological information, determine a setting value of at least one of an illuminance, a wavelength, and a lighting pattern included in the second illumination setting information on the basis of the received meteorological information.

In this case, meteorological information is received, and a setting value of at least one of an illuminance, a wavelength, and a lighting pattern included in the second illumination setting information is determined on the basis of the received meteorological information. Thus, for example, the meteorological information about the day when the user wakes up can be represented by a setting value of at least one of the illuminance, wavelength, and lighting pattern of the illumination device, and the meteorological information can be provided to the user.

Also, in the above-described aspect, for example, the method may further include causing the computer of the communications terminal to, in a case where the communications terminal receives earthquake information indicating that an earthquake has occurred, judge whether a motion of the communications terminal is due to the user or the earthquake on the basis of the received earthquake information; and causing the computer of the communications terminal to, in a case where it is judged that the motion of the communications terminal is due to the earthquake, change a setting value of at least one of an illuminance, a wavelength, and a lighting pattern included in the second illumination setting information to a specific setting value indicating that an earthquake has occurred, and transmit the second control signal to the illumination device.

In this case, earthquake information indicating that an earthquake has occurred is received. In a case where a motion of the communications terminal is sensed, it is judged whether the motion of the communications terminal is due to the user or the earthquake, on the basis of the received earthquake information. In a case where it is judged that the motion of the communications terminal is due to the earthquake, a setting value of at least one of the illuminance, wavelength, and lighting pattern included in the second illumination setting information is changed to a specific setting value indicating that an earthquake has occurred, and a second control signal is transmitted to the illumination device.

In a case where it is judged that the motion of the communications terminal is due to the earthquake, a setting value of at least one of the illuminance, wavelength, and lighting pattern included in the second illumination setting information is changed to a specific setting value indicating that an earthquake has occurred. Thus, the user can be notified that an earthquake has occurred, using illumination of the illumination device.

Also, in the above-described aspect, for example, the method may further include causing the computer of the communications terminal to store third illumination setting information in the memory, the third illumination setting information being used to set an illumination state of the illumination device in a space after an earthquake has occurred, the third illumination setting information including a setting value of at least one of an illuminance, a wavelength, and a lighting pattern of the illumination device; and causing the computer of the communications terminal to, in a case where another motion of the communications terminal is sensed after it is judged that the motion of the communications terminal is due to the earthquake, transmit a third control signal corresponding to the third illumination setting information to the illumination device.

In this case, the third illumination setting information for setting the illumination state of the illumination device in a space after an earthquake has occurred is stored. The third illumination setting information includes a setting value of at least one of an illuminance, a wavelength, and a lighting pattern of the illumination device. In a case where another motion of the communications terminal is sensed after it is judged that the motion of the communications terminal is due to the earthquake, the third control signal is transmitted to the illumination device.

In a case where another motion of the communications terminal is sensed after it is judged that the motion of the communications terminal is due to the earthquake, the third control signal is transmitted to the illumination device. Thus, after the earthquake has occurred, a space can be brightly illuminated to help the user evacuate.

Also, in the above-described aspect, for example, the method may further include causing the computer of the communications terminal to store fourth illumination setting information in the memory, the fourth illumination setting information being used to set an illumination state of the illumination device in a space when the user goes to bed, the fourth illumination setting information including a setting value of at least one of an illuminance, a wavelength, and a lighting pattern of the illumination device; causing the computer of the communications terminal to determine a recommended bedtime of the user on the basis of log information representing a history of times at which a motion of the communications terminal was sensed; and causing the computer of the communications terminal to transmit a fourth control signal corresponding to the fourth illumination setting information to the illumination device when a current time becomes the recommended bedtime.

In this case, the fourth illumination setting information for setting an illumination state of the illumination device in a space when a user goes to bed is stored. The fourth illumination setting information includes a setting value of at least one of an illuminance, a wavelength, and a lighting pattern of the illumination device. A user's recommended bedtime is determined on the basis of log information representing a history of times at which a motion of the communications terminal was sensed. When the current time becomes the recommended bedtime, the fourth control signal is transmitted to the illumination device.

A user's recommended bedtime is determined on the basis of log information representing a history of times at which a motion of the communications terminal was sensed, and thus a time at which the user goes to bed can be automatically set, and convenience can be increased. When the current time becomes the recommended bedtime, the fourth control signal for setting an illumination state of the illumination device in a space when the user goes to bed is transmitted to the illumination device. Accordingly, the user can be notified of the bedtime, and illumination control suitable for the bedtime can be performed.

Also, in the above-described aspect, for example, the fourth control signal may be a control signal for gradually changing the illuminance of the illumination device, or a control signal for gradually changing the wavelength of the illumination device.

In this case, the fourth control signal may be, for example, a control signal for gradually decreasing the illuminance of the illumination device or a control signal for gradually changing the wavelength of the illumination device. Accordingly, comfortable bedtime can be provided to the user.

Also, in the above-described aspect, for example, the fourth illumination setting information includes a plurality of illumination states of the illumination device in the space corresponding to meteorological information. The method may further include causing the computer of the communications terminal to, in a case where the communications terminal receives meteorological information, determine an illumination state corresponding to the received meteorological information among the plurality of illumination states represented by the fourth illumination setting information.

In this case, meteorological information is received, and an illumination state corresponding to the received meteorological information is determined. Thus, for example, the meteorological information about the day after the day when the user goes to bed can be represented by an illumination state of the illumination device, and the user can be notified of the meteorological information.

An aspect of the present disclosure is a method for controlling a communications terminal that controls an illumination device via a network. The communications terminal includes a memory and a sensor that senses a motion of the communications terminal. The method includes causing a computer of the communications terminal to store first illumination setting information and second illumination setting information in the memory, the first illumination setting information being used to set an illuminance of light emitted by the illumination device to a first illuminance, the second illumination setting information being used to set the illuminance of the light emitted by the illumination device to a second illuminance higher than the first illuminance; causing the computer of the communications terminal to, at a certain illumination start time at which the illumination device is to be turned on, transmit a first control signal corresponding to the first illumination setting information to the illumination device via the network and light the illumination device with the first illuminance; and causing the computer of the communications terminal to, in a case where the sensor senses a motion of the communications terminal after the certain illumination start time has passed, transmit a second control signal corresponding to the second illumination setting information to the illumination device via the network and change the illuminance of the light emitted by the illumination device from the first illuminance to the second illuminance.

In this case, the first illumination setting information for setting an illumination state before a user wakes up and the second illumination setting information for setting an illumination state after the user wakes up are stored. When the current time becomes the illumination start time, the first control signal is transmitted to the illumination device, and the illumination device is lit with the first illuminance. In a case where a motion of the communications terminal is sensed, the second control signal is transmitted to the illumination device, and the illumination device is lit with the second illuminance higher than the first illuminance.

Accordingly, the awakening of the user can be easily detected through a motion of the communications terminal, and the illumination device can be controlled easily and appropriately after the user has woken up.

Also, in the above-described aspect, for example, the method may further include causing the computer of the communications terminal to, in a case where the sensor senses a motion of the communications terminal before the certain illumination start time has passed, transmit the second control signal to the illumination device via the network and light the illumination device with the second illuminance.

In this case, for example, the illumination device can be lit even in a case where the user wakes up at midnight.

Also, in the above-described aspect, for example, the method may further include causing the computer of the communications terminal to, in a case where the communications terminal senses receipt of something before the certain illumination start time has passed, transmit the second control signal to the illumination device via the network and light the illumination device with the second illuminance.

Also, in the above-described aspect, for example, the communications terminal may include a message application or a telephone application installed therein, and the receipt of something may be receipt of a message using the message application or receipt of a call using the telephone application.

In this case, for example, the illumination device can be lit with the second illuminance even in a case where the user receives a telephone call or a mail at midnight.

Also, in the above-described aspect, for example, the second illuminance set by the second illumination setting information in a case where the sensor senses a motion of the communications terminal after the certain illumination start time has passed may be identical to the second illuminance set by the second illumination setting information in a case where the sensor senses a motion of the communications terminal before the certain illumination start time has passed.

In this case, for example, the illumination device can be lit with the second illuminance even in a case where the user wakes up at midnight.

Also, in the above-described aspect, for example, the second illuminance set by the second illumination setting information in a case where the sensor senses a motion of the communications terminal after the certain illumination start time has passed may be different from the second illuminance set by the second illumination setting information in a case where the sensor senses a motion of the communications terminal before the certain illumination start time has passed.

In this case, for example, the illumination device can be lit with an illuminance different from the second illuminance (an illuminance lower than the second illuminance, including an illuminance of 0) even in a case where the user wakes up at midnight.

Also, in the above-described aspect, for example, the first illumination setting information and the second illumination setting information may each include information for setting a color of light emitted by the illumination device, and a first color represented by the first illumination setting information may be different from a second color represented by the second illumination setting information.

In this case, the color of light of the illumination device before and after the awakening can be appropriately set in accordance with the personal preference of the user.

Also, in the above-described aspect, for example, the first illumination setting information and the second illumination setting information may each include information for setting a lighting pattern of light emitted by the illumination device, and a first lighting pattern represented by the first illumination setting information may be different from a second lighting pattern represented by the second illumination setting information.

In this case, the lighting pattern of light of the illumination device before and after the awakening can be appropriately set in accordance with the personal preference of the user.

A method for controlling a communications terminal according to an embodiment of the present disclosure is useful as a method for controlling a communications terminal that controls an illumination device via a network.

What is claimed is:

1. A method for controlling a communications terminal that remotely controls an illumination device via a network, the method comprising:

causing a computer of the communications terminal to store first illumination setting information and second illumination setting information in a memory provided in the communications terminal, the first illumination setting information being used to light the illumination device with a first illumination state, the second illumination setting information being used to light the illumination device with a second illumination state different from the first illumination state;

causing the computer of the communications terminal to transmit, at a certain illumination start time at which the illumination device is to be turned on, a first control signal corresponding to the first illumination setting information to the illumination device via the network in order to light the illumination device with the first illumination state; and causing the computer of the communications terminal to transmit, in a case where a sensor provided in the communications terminal senses a motion of the communications terminal after the certain illumination start time, a second control signal corresponding to the second illumination setting information to the illumination device via the network in order to light the illumination device with the second illumination state, wherein the certain illumination start time is within a predetermined time from an expected wake-up time of a user of the communications terminal.

2. The method according to claim 1, further comprising: causing the computer of the communications terminal to transmit, in a case where the sensor senses the motion of the communications terminal before the certain illumination start time, the second control signal to the illumination device via the network.

3. The method according to claim 2, wherein the second control signal that is transmitted in the case where the sensor senses the motion of the communications terminal after the certain illumination start time is identical to the second control signal that is transmitted in the case where the sensor senses the motion of the communications terminal before the certain illumination start time.

4. The method according to claim 2, wherein the second control signal that is transmitted in the case where the sensor senses the motion of the communications terminal after the certain illumination start time is different from the second control signal that is transmitted in the case where the sensor senses the motion of the communications terminal before the certain illumination start time.

5. The method according to claim 1, wherein the first illumination setting information and the second illumination setting information each represent an illuminance of light emitted by the illumination device, and a second illuminance represented by the second illumination state is higher than a first illuminance represented by the first illumination state.

6. The method according to claim 1, wherein the first illumination setting information and the second illumination setting information each represent a color of light emitted by the illumination device, and a first color represented by the first illumination state is different from a second color represented by the second illumination state.

7. The method according to claim 1, wherein the first illumination setting information and the second illumination setting information each represent a lighting pattern of light emitted by the illumination device, and a first lighting pattern represented by the first illumination state is different from a second lighting pattern represented by the second illumination state.

8. The method according to claim 5, further comprising:
causing the computer of the communications terminal to transmit, in a case where the communications terminal senses receipt of something before the certain illumination start time, the second control signal to the illumination device via the network in order to light the illumination device with the second illuminance.

9. The method according to claim 8, wherein
the communications terminal includes a message application or a telephone application installed therein, and
the receipt of something is receipt of a message using the message application or receipt of a call using the telephone application.

10. The method according to claim 1, further comprising:
causing the computer of the communications terminal to store alarm setting information representing a time at which an alarm is to be output in the memory;
causing the computer of the communications terminal to determine, in a case where the communications terminal receives meteorological information, the alarm setting information on the basis of the received meteorological information; and
causing the computer of the communications terminal to determine the illumination start time on the basis of the alarm setting information.

11. The method according to claim 1, further comprising:
causing the computer of the communications terminal to store alarm setting information representing a time at which an alarm is to be output in the memory; and
causing the computer of the communications terminal to determine, in a case where the communications terminal receives schedule information representing a schedule of a user of the communications terminal, the alarm setting information on the basis of the received schedule information.

12. The method according to claim 5, further comprising:
causing the computer of the communications terminal to determine, in a case where the communications terminal receives power usage information representing power usage in a certain area in which the illumination device is provided or electricity fee information representing electricity fees in individual certain time slots in the certain area, a range of the second illuminance settable in the communications terminal, on the basis of the received power usage information or electricity fee information.

13. The method according to claim 6, further comprising:
causing the computer of the communications terminal to determine, in a case where the communications terminal receives power usage information representing power usage in a certain area in which the illumination device is provided or electricity fee information representing electricity fees in individual certain time slots in the certain area, a range of a wavelength corresponding to the second color and settable in the communications terminal, on the basis of the received power usage information or electricity fee information.

14. The method according to claim 5,
the communications terminal including a measurement device that measures an illuminance of light emitted by the illumination device,
the method further comprising:
causing the computer of the communications terminal to determine a range of the second illuminance settable in the communications terminal, on the basis of the illuminance measured by the measurement device.

15. The method according to claim 6,
the communications terminal including a measurement device that measures an illuminance of light emitted by the illumination device,
the method further comprising:
causing the computer of the communications terminal to determine a range of a wavelength corresponding to the second color and settable in the communications terminal, on the basis of the illuminance measured by the measurement device.

16. The method according to claim 1, further comprising:
causing the computer of the communications terminal to, in a case where the communications terminal receives meteorological information, determine a setting value of at least one of an illuminance, a wavelength, and a lighting pattern included in the second illumination setting information on the basis of the received meteorological information.

17. The method according to claim 1, further comprising:
causing the computer of the communications terminal to judge, in a case where the communications terminal receives earthquake information indicating that an earthquake has occurred, whether the motion of the communications terminal is due to a user or the earthquake on the basis of the received earthquake information; and
causing the computer of the communications terminal to change, in a case where it is judged that the motion of the communications terminal is due to the earthquake, a setting value of at least one of an illuminance, a wavelength, and a lighting pattern included in the second illumination setting information to a specific setting value indicating that the earthquake has occurred, and transmit the second control signal to the illumination device.

18. The method according to claim 17, further comprising:
causing the computer of the communications terminal to store third illumination setting information in the memory, the third illumination setting information being used to light the illumination device with a third illumination state in a space after the earthquake has occurred, the third illumination setting information including a setting value of at least one of an illuminance, a wavelength, and a lighting pattern of the illumination device; and causing the computer of the communications terminal to transmit, in a case where another motion of the communications terminal is sensed after it is judged that the motion of the communications terminal is due to the earthquake, a third control signal corresponding to the third illumination setting information to the illumination device in order to light the illumination device with the third illumination state.

19. The method according to claim 1, further comprising:

causing the computer of the communications terminal to store fourth illumination setting information in the memory, the fourth illumination setting information being used to light the illumination device with a fourth illumination state in a space when a user goes to bed, the fourth illumination setting information including a setting value of at least one of an illuminance, a wavelength, and a lighting pattern of the illumination device;

causing the computer of the communications terminal to determine a recommended bedtime of the user on a basis of log information representing a history of times at which the motion of the communications terminal was sensed; and causing the computer of the communications terminal to transmit a fourth control signal corresponding to the fourth illumination setting information to the illumination device in order to light the illumination device with the fourth illumination state when a current time becomes the recommended bedtime.

20. A non-transitory computer readable recording medium on which a program is recorded, the program being executed in a communications terminal that controls an illumination device remotely via a network, the program causing a computer of the communications terminal to:

store first illumination setting information and second illumination setting information in a memory provided in the communications terminal, the first illumination setting information being used to light the illumination device with a first illumination state, the second illumination setting information being used to light the illumination device with a second illumination state different from the first illumination state;

transmit, at a certain illumination start time at which the illumination device is to be turned on, a first control signal corresponding to the first illumination setting information to the illumination device via the network in order to light the illumination device with the first illumination state; and transmit, in a case where a sensor provided in the communications terminal senses a motion of the communications terminal after the certain illumination start time, a second control signal corresponding to the second illumination setting information to the illumination device via the network in order to light the illumination device with the second illumination state, wherein the certain illumination start time is within a predetermined time from an expected wake-up time of a user of the communications terminal.

21. An illumination control system including an illumination device and a communications terminal that remotely controls the illumination device via a network, wherein the communications terminal includes a controller, a memory, and a sensor that senses a motion of the communications terminal, the memory stores first illumination setting information and second illumination setting information, the first illumination setting information being used to light the illumination device with a first illumination state, the second illumination setting information being used to light the illumination device with a second illumination state different from the first illumination state, at a certain illumination start time at which the illumination device is to be turned on, the controller of the communications terminal transmits a first control signal corresponding to the first illumination setting information to the illumination device via the network, and, in a case where the sensor senses the motion of the communications terminal after the certain illumination start time, the controller of the communications terminal transmits a second control signal corresponding to the second illumination setting information to the illumination device via the network, and the illumination device lights up in the first illumination state upon receipt of the first control signal, and lights up in the second illumination state upon receipt of the second control signal, wherein the certain illumination start time is within a predetermined time from an expected wake-up time of a user of the communications terminal.

22. An illumination device connected to the illumination control system according to claim 21.

23. A method for controlling a communications terminal that remotely controls an illumination device via a network, the method comprising:

causing a computer of the communications terminal to store first illumination setting information and second illumination setting information in a memory provided in the communications terminal, the first illumination setting information being used to light an illuminance of light emitted by the illumination device with a first illuminance, the second illumination setting information being used to light the illuminance of the light emitted by the illumination device with a second illuminance higher than the first illuminance;

causing the computer of the communications terminal to transmit, at a certain illumination start time at which the illumination device is to be turned on, a first control signal corresponding to the first illumination setting information to the illumination device via the network and light the illumination device with the first illuminance; and causing the computer of the communications terminal to transmit, in a case where a sensor provided in the communications terminal senses a motion of the communications terminal after the certain illumination start time, a second control signal corresponding to the second illumination setting information to the illumination device via the network and change the illuminance of the light emitted by the illumination device from the first illuminance to the second illuminance, wherein the certain illumination start time is before a predetermined time from an expected wake-up time of a user of the communications terminal or is after the predetermined time from the expected wake-up time.

* * * * *